US00RE46066E

(19) United States
(12) Reissued Patent
Kubota et al.

(10) Patent Number: US RE46,066 E
(45) Date of Reissued Patent: Jul. 12, 2016

(54) IMAGING LENS

(71) Applicants: OPTICAL LOGIC INC., Nagano (JP); KANTATSU CO., LTD., Tochigi (JP)

(72) Inventors: Yoji Kubota, Nagano (JP); Kenichi Kubota, Nagano (JP); Hitoshi Hirano, Nagano (JP); Ichiro Kurihara, Tochigi (JP); Yoshio Ise, Tochigi (JP); Tomohiro Yonezawa, Tochigi (JP)

(73) Assignees: OPTICAL LOGIC INC., Nagano (JP); KANTATSU CO., LTD., Tochigi (JP)

(21) Appl. No.: 14/824,208

(22) Filed: Aug. 12, 2015

Related U.S. Patent Documents

Reissue of:
(64) Patent No.: 8,879,167
Issued: Nov. 4, 2014
Appl. No.: 13/597,521
Filed: Aug. 29, 2012

(30) Foreign Application Priority Data

Sep. 1, 2011 (JP) ..... 2011-190560

(51) Int. Cl.
*G02B 3/02* (2006.01)
*G02B 13/18* (2006.01)
(Continued)

(52) U.S. Cl.
CPC ..... *G02B 13/0045* (2013.01); *G02B 9/60* (2013.01); *G02B 13/18* (2013.01)

(58) Field of Classification Search
CPC ..... G02B 13/0045; G02B 9/60; G02B 13/18
USPC ..... 359/763, 764
See application file for complete search history.

(56) References Cited

U.S. PATENT DOCUMENTS 7,502,181 B2 * 3/2009 Shinohara ..... G02B 9/60 359/764
7,911,711 B1 * 3/2011 Tang et al. ..... 359/764
8,000,031 B1 * 8/2011 Tsai ..... 359/714
(Continued)

FOREIGN PATENT DOCUMENTS

JP 2007-264180 A 10/2007

OTHER PUBLICATIONS

Hobbs, P. C. D. Chapter 4: Lenses, Prisms, and Mirrors, in Building Electro-Optical Systems: Making it all Work, Second Edition, John Wiley & Sons, Inc., Hoboken, NJ, USA, 2009, pp. 145-179.*
"Effective Focal Length." Collins Dictionary of Astronomy. Eds. John Daintith and William Gould. London: Collins, 2006.*

*Primary Examiner* — Christina Y Leung
(74) *Attorney, Agent, or Firm* — Kubotera & Associates, LLC

(57) ABSTRACT

An imaging lens includes a first lens having positive refractive power; a second lens having negative refractive power; a third lens having positive refractive power; and a fourth and a fifth lens having negative refractive power. The first lens is formed so that a curvature radius of an object-side surface is positive and the second lens is formed so that a curvature radius of an object-side surface and a curvature radius of an image plane-side surface are positive. The third lens is formed so that a curvature radius of an object-side surface is positive, and the fifth lens is formed so that a curvature radius of an object-side surface and a curvature radius of an image plane-side surface are both positive. An Abbe's number from the first and the third to the fifth lens is greater than 45, and an Abbe's number of the second lens is less than 35.

20 Claims, 15 Drawing Sheets

(51) Int. Cl.
*G02B 13/00* (2006.01)
*G02B 9/60* (2006.01)

(56) References Cited

U.S. PATENT DOCUMENTS 8,072,695 B1 * 12/2011 Lee ..... G02B 13/0045 359/714
8,179,614 B1 * 5/2012 Tsai ..... G02B 13/0045 359/714
8,179,615 B1 * 5/2012 Tang et al. ..... 359/714
8,279,537 B2 * 10/2012 Sato ..... G02B 13/004 359/714
8,411,374 B2 * 4/2013 Ohtsu ..... H04N 5/2254 348/340
8,743,482 B1 * 6/2014 Tsai et al. ..... 359/757
8,786,962 B2 * 7/2014 Chen et al. ..... 359/714
2009/0122423 A1 * 5/2009 Park ..... G02B 9/34 359/764
2010/0214467 A1 * 8/2010 Ohtsu ..... G02B 9/60 348/345
2010/0253829 A1 * 10/2010 Shinohara ..... G02B 13/0045 348/340
2011/0013069 A1 * 1/2011 Chen ..... G02B 9/60 348/335
2011/0134305 A1 * 6/2011 Sano et al. ..... 348/340
2011/0164327 A1 * 7/2011 Sato ..... 359/714
2011/0249348 A1 * 10/2011 Kubota ..... G02B 13/0045 359/764
2012/0087019 A1 * 4/2012 Tang et al. ..... 359/714
2012/0087020 A1 * 4/2012 Tang et al. ..... 359/714

* cited by examiner

IMAGING LENS

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

BACKGROUND OF THE INVENTION AND RELATED ART STATEMENT

The present invention relates to an imaging lens for forming an optical image on an imaging element such as a CCD sensor and a CMOS sensor. Particularly, the present invention relates to an imaging lens suitable for mounting in a relatively small camera such as a cellular phone, a digital still camera, a portable information terminal, a security camera, an onboard camera, and a network camera.

Performances of a camera mounted in a cellular phone have been improved every year, and there is even a camera having optical performances comparable to those of a digital still camera. The resolution of an imaging element that used to be several hundred thousand pixels has been improved to several megapixels, and the resolution of a camera has been dramatically improved. An imaging lens for mounting in such camera needs to not only have a small size, but also have resolution comparable to that of a high-resolution imaging element, i.e., ability to satisfactorily correct aberrations.

Conventionally, in order to attain both sufficient optical performances and miniaturization, it is typical to adopt an imaging lens having two or three-lens configuration. However, optical performances required for such a high-resolution imaging element have been increased each year, so that it is difficult to sufficiently correct aberrations anymore. Further, it is difficult to meet those optical performance requirements with such a two- or three-lens configuration. For this reason, a four- or five-lens configuration has been studied and practically applied in recent years.

Among them, since a five-lens configuration has high flexibility in designing, it is expected to be a lens configuration to be applied to a next generation imaging lens. For example, an imaging lens described in Patent Reference includes a first lens that is convex on an object-side surface thereof and is positive; a second lens that has a shape of a negative meniscus lens directing a concave surface thereof to an image plane side; a third lens that has a shape of a positive meniscus lens directing a convex surface thereof to the image plane side; a fourth lens that has aspheric shapes on both surfaces thereof, is concave on an image plane-side surface thereof near an optical axis, and is negative; and a fifth lens that has aspheric shapes on both surfaces thereof and is positive or negative, arranged in this order from the object side. In addition, there are limitations in a lower limit of Abbe's number of the first lens and an upper limit of Abbe's number of the second and the fourth lenses. With the lens configuration like this, according to the imaging lens, it is possible to satisfactorily correct an axial chromatic aberration and a chromatic aberration of magnification.

Patent Reference: Japanese Patent Application Publication No. 2007-264180

According to the imaging lens described in Patent Reference, it is possible to obtain relatively satisfactory aberrations. However, since the total length of the lens system is long, it is difficult to attain both miniaturization of the imaging lens and satisfactory aberration correction. Here, such challenge of attaining both miniaturization and satisfactory aberration correction is not specific to the imaging lens for mounting in a cellular phone, but common among imaging lenses for mounting in relatively small cameras such as digital still cameras, portable information terminals, security cameras, onboard cameras, and network cameras.

In view of the above-described problems, an object of the present invention is to provide an imaging lens that can satisfactorily correct aberrations in spite of the small size thereof.

Further objects and advantages of the invention will be apparent from the following description of the invention.

SUMMARY OF THE INVENTION

In order to attain the objects described above, according to an aspect of the present invention, an imaging lens includes a first lens having positive refractive power; a second lens having negative refractive power; a third lens having positive refractive power; a fourth lens having negative refractive power; and a fifth lens having negative refractive power, arranged in the order from an object side to an image plane side. The first lens is formed in a shape so that a curvature radius of an object-side surface thereof is positive and the second lens is formed in a shape so that a curvature radius of an object-side surface thereof and a curvature radius of an image plane-side surface thereof are both positive. The third lens is formed in a shape so that a curvature radius of an object-side surface thereof is positive, and the fifth lens is formed in a shape so that a curvature radius of an object-side surface thereof and a curvature radius of an image plane-side surface thereof are both positive. According to the configuration, the imaging lens of the invention satisfies a condition that an Abbe's number of each lens from the first lens, and the third lens to the fifth lens is greater than 45 and an Abbe's number of the second lens is less than 35.

In order to enhance resolution of an imaging lens so as to be compatible with a high-resolution imaging element available in these years, it is necessary to satisfactorily correct aberrations, especially chromatic aberrations. According to a configuration of the imaging lens of the invention, the Abbe's number of the first lens is greater than 45 and the Abbe's number of the second lens is less than 35, and the first lens and the second lens are formed by combining a low-dispersion material and a high-dispersion material. In addition, each lens from the third lens to the fifth lens has the Abbe's number greater than 45 and is formed of a low-dispersion material. Therefore, a chromatic aberration occurred in the first lens is corrected by the second lens and at the same time, satisfactorily corrected through each lens from the third lens to the fifth lens.

Here, according to the imaging lens having the above-described configuration, preferably, each lens of the first lens and lenses from the third to the fifth lenses has the same Abbe's number and is made of the same material. With this configuration, it is possible to suitably attain productivity improvement and manufacturing cost reduction of the imaging lens. In addition, forming each lens from the first lens to the fifth lens from a plastic material, it is possible to further attain productivity improvement and manufacturing cost reduction.

When the first lens has a focal length f1, the second lens has a focal length f2, the third lens has a focal length f3, the fourth lens has a focal length f4, and the fifth lens has a focal length f5, the imaging lens having the above-described configuration preferably satisfies the following conditional expressions (1) and (2):

$$f1<f3 \text{ and } |f2|<f3 \quad (1)$$

$$f3<|f4| \text{ and } |f2|<|f5| \quad (2)$$

When the imaging lens satisfies the conditional expressions (1) and (2), it is possible to satisfactorily correct aberrations while attaining miniaturization of the imaging lens. When the imaging lens satisfies the conditional expressions (1) and (2), the first lens and the second lens, which are arranged on the object side, have stronger refractive power than other three lenses. With the configuration, it is possible to shorten a total optical length of the imaging lens while securing certain angle of view, and it is possible to suitably attain miniaturization of the imaging lens. In addition, according to the invention, each lens from the third lens to the fifth lens has relatively weak refractive power. Aberrations occurred in the first lens and the second lens, which have strong refractive powers, are suitably corrected through each lens from the third lens to the fifth lens, which have weak refractive powers.

In the imaging lens having the above-described configuration, the fourth lens is preferably formed in a shape so that a curvature radius of an object-side surface thereof and a curvature radius of an image plane-side surface thereof are both negative.

As described above, the second lens is formed in a shape so that a curvature radius of the object-side surface thereof and a curvature radius of the image plane-side surface thereof are both positive, i.e. a shape of a meniscus lens directing a convex surface thereof to the object side. Furthermore, the fourth lens is formed in a shape so that a curvature radius of the object-side surface thereof and a curvature radius of the image plane-side surface thereof are both negative, i.e. a shape of a meniscus lens directing a concave surface thereof to the object side. Therefore, the second lens and the fourth lens are arranged disposing their concave surfaces to the third lens. With this configuration, aberrations occurred in the first lens are suitably corrected also by the negative-positive-negative refractive power arrangement of the lenses from the second to the fourth lenses and the shapes of the respective lenses of the second lens and the fourth lens.

When the whole lens system has a focal length f and the second lens has the focal length f2, the imaging lens having the above-described configuration preferably satisfies the following conditional expression (3):

$$-1.8<f2/f<-0.8 \quad (3)$$

When the imaging lens satisfies the conditional expression (3), it is possible to restrain a chromatic aberration and a field curvature within preferred ranges. When the value exceeds the upper limit "−0.8", since the second lens has strong refractive power in relative to the whole lens system, an axial chromatic aberration is excessively corrected (a focal position at a short wavelength moves towards the image plane side in relative to a focal position at a reference wavelength), and at the same time, an off-axis chromatic aberration of magnification is excessively corrected (an image-forming point at a short wavelength moves in a direction to be away from the optical axis in relative to an image-forming point at a reference wavelength). In addition, an image-forming surface curves to the image plane side and it is difficult to obtain satisfactory image-forming performance. On the other hand, when the value is below the lower limit "−1.8", the second lens has weak refractive power in relative to the whole lens system, so that an axial chromatic aberration is insufficiently corrected (a focal position at a short wavelength moves towards the object side in relative to a focal position at a reference wavelength) and an off-axis chromatic aberration of magnification is insufficiently corrected (an image-forming point at a short wavelength moves in a direction to approach the optical axis in relative to an image-forming point at a reference wavelength). Moreover, an image-forming surface curves to the object side, so that it is difficult to obtain satisfactory image-forming performance also in this case.

When the first lens has the focal length f1 and the second lens has the focal length f2, the imaging lens having the above-described configuration preferably satisfies the following conditional expression (4):

$$-1.0<f1/f2<-0.4 \quad (4)$$

When the imaging lens satisfies the conditional expression (4), it is possible to restrain an astigmatism, a field curvature, and a chromatic aberration within preferred ranges in a well-balanced manner, while restraining Petzval sum near zero. When the value exceeds the upper limit "−0.4", the first lens has strong refractive power in relative to the second lens, an axial and an off-axis chromatic aberrations are insufficiently corrected. As for the astigmatism, a tangential image surface tilts to the object side and an astigmatic difference increases. For this reason, it is difficult to obtain satisfactory image-forming performance. On the other hand, when the value is below the lower limit "−1.0", the first lens has weak refractive power in relative to the second lens, so that negative refractive power is strong and an axial and an off-axial chromatic aberrations are excessively corrected. In addition, an image-forming surface curves to the image plane side. As for the astigmatism, a tangential image surface tilts to an image plane side and the astigmatic difference increases. Therefore, also in this case, it is difficult to obtain satisfactory image-forming performance.

When a curvature radius of the object-side surface of the second lens is R2f and a curvature radius of the image plane-side surface thereof is R2r, the imaging lens having the above-described configuration preferably satisfies the following conditional expression (5):

$$1.5<R2f/R2r<6.0 \quad (5)$$

When the imaging lens satisfies the conditional expression (5), it is possible to restrain a coma aberration, a field curvature, and a chromatic aberration within preferred ranges, respectively. When the value exceeds the upper limit "6.0", the second lens has relatively strong refractive power, an outer coma aberration of an off-axis light beam increases, and an axial and an off-axis chromatic aberrations are excessively corrected. In addition, since an image-forming surface curves to the image plane side, it is difficult to obtain satisfactory image forming performance. On the other hand, when the value is below the lower limit "1.5", the second lens has relatively weak refractive power, and the axial and the off-axis chromatic aberrations are insufficiently corrected. Moreover, the image forming surface curves to the object side, and also in this case, it is difficult to obtain satisfactory image forming performance.

When the whole lens system has the focal length f and the third lens has the focal length f3, the imaging lens having the above-described configuration preferably satisfies the following conditional expression (6):

$$5.0<f3/f<20.0 \quad (6)$$

According to the imaging lens of the invention, the third lens mainly serves for correcting aberrations. When the imaging lens satisfies the conditional expression (6), it is possible to more satisfactorily correct aberrations while attaining miniaturization of the imaging lens. When the value exceeds the upper limit "20.0", since the third lens has weak refractive power in relative to the whole lens system, it is difficult to attain miniaturization of the imaging lens. Here, when the third lens has weak refractive power, it is possible to attain miniaturization of the imaging lens by increasing the refractive power of the fourth lens or the fifth lens. In this case, however, it is difficult to correct aberrations (especially coma aberration), and it is difficult to obtain satisfactory image forming performance. On the other hand, when the value is below the lower limit "5.0", although it is advantageous for attaining miniaturization of the imaging lens, the coma aberration increases and the astigmatic difference also increases. Therefore, also in this case, it is difficult to obtain satisfactory image forming performance.

When the maximum effective diameter of the object-side surface of the third lens is $\Phi_{3A}$, the maximum effective diameter of the image plane-side surface thereof is $\Phi_{3B}$, the maximum effective diameter of the object-side surface of the fourth lens is $\Phi_{4A}$, the maximum effective diameter of the image plane-side surface thereof is $\Phi_{4B}$, and the maximum absolute value of a sag (sagittal height) at up to 70% of the maximum effective diameters $\Phi_{3A}$ to $\Phi_{4B}$ is $Z_{0.7}$, the imaging lens having the above-described configuration preferably satisfies the following conditional expression (7):

$$Z_{0.7}/f<0.1 \quad (7)$$

Therefore, restraining the maximum sag within certain range, the third lens and the fourth lens are formed in shapes that have substantially uniform thickness in the optical axis direction and are less curved. With such shapes of the third and the fourth lenses, generation of complicated aberrations is restrained and aberrations occurred in the first and the second lenses are satisfactorily corrected. Furthermore, sensitivity to deterioration of the image-forming performance due to decentering (axial displacement), tilting, or the like upon manufacturing the imaging lens, i.e., so-called "production error sensitivity" decreases. In addition, because of the substantially uniform thickness in the optical axis direction, fabrication properties upon production are improved and manufacturing cost of the imaging lens is restrained. Here, "sag" means, in each surface, a distance in a direction parallel to the optical axis from a tangential plane that is orthogonal to the optical axis to the surface.

When the whole lens system has the focal length f and a composite focal length of the third lens and the fourth lens is f34, the imaging lens having the above-described configuration preferably satisfies the following conditional expression (8):

$$5.0<f34/f<25.0 \quad (8)$$

Restraining a ratio of the composite focal length of the third lens and the fourth lens to the focal length of the whole lens system within the range defined by the conditional expression (8), it is possible to more satisfactorily correct aberrations. When the value exceeds the upper limit "25.0", the composite refractive power of the third lens and the fourth lens is relatively weak and it is difficult to restrain aberrations within preferred ranges in a well-balanced manner. On the other hand, when the value is below the lower limit "5.0", composite refractive power of the third lens and the fourth lens is relatively strong, so although it is advantageous for correction of a distortion, the astigmatic difference increases. Therefore it is difficult to obtain satisfactory image-forming performance.

When a distance on the optical axis from the image plane-side surface of the second lens to the object-side surface of the third lens is dA and a distance on the optical axis from the image plane-side surface of the third lens to the object-side surface of the fourth lens is dB, the imaging lens having the above-described configuration preferably satisfies the following conditional expression (9):

$$0.3<dA/dB<1.5 \quad (9)$$

In case of an imaging element such as a CCD sensor and a CMOS sensor, there is a limited range in an angle to take an incident light beam due to its structure. When an emitting angle of an off-axis light beam is outside the limited range above, it is difficult for a sensor to take therein light beams outside the limited range, which results in a so-called shading phenomenon. More specifically, an image obtained through the imaging lens has a dark periphery that is darker than the center part.

When the imaging lens satisfies the conditional expression (9), it is possible to keep the maximum emitting angle of an off-axis light beam small, while attaining miniaturization of the imaging lens. When the value exceeds the upper limit "1.5", although it is easy to keep the maximum emitting angle of the off-axis light beam small, it is difficult to attain miniaturization of the imaging lens. On the other hand, when the value is below the lower limit "0.3", although it is advantageous for miniaturization of the imaging lens, a chromatic aberration is insufficiently corrected and it is difficult to obtain satisfactory image-forming performance. In addition, since the maximum emitting angle of an off-axis light beam is large, the shading phenomenon easily occurs.

According to the imaging lens of the invention, it is possible to attain both miniaturization and satisfactory aberration correction of the imaging lens and provide a small-sized imaging lens with satisfactorily corrected aberrations.

DETAILED DESCRIPTION OF PREFERRED EMBODIMENTS

Hereunder, referring to the accompanying drawings, an embodiment of the present invention will be fully described.

FIGS. 1, 4, 7, 10, and 13 are schematic sectional views of imaging lenses in Numerical Data Examples 1 to 5 according to the embodiment, respectively. Since a basic lens configuration is the same among those Numerical Data Examples, the lens configuration of the embodiment will be described with reference to the schematic sectional view of Numerical Data Example 1.

Figure 1:
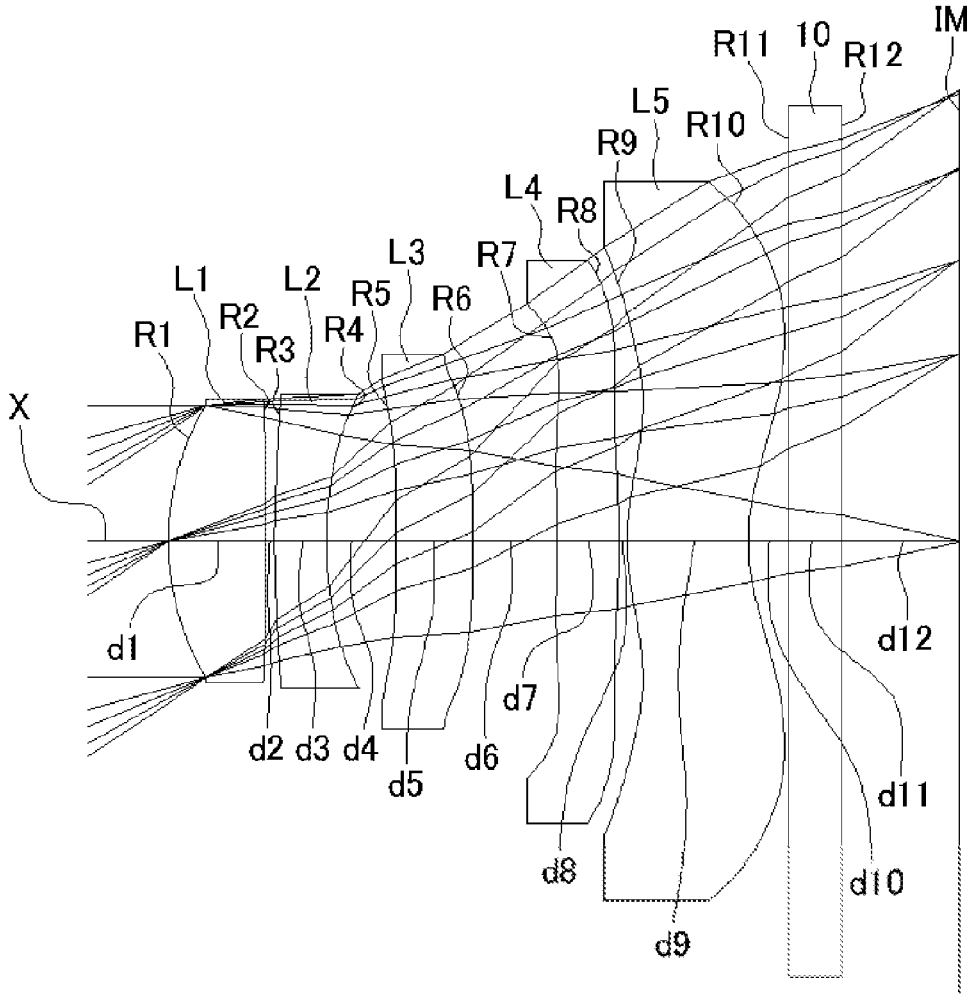
FIG. 1 is a sectional view showing a schematic configuration of an imaging lens of Numerical Data Example 1 according to an embodiment of the invention.

As shown in FIG. 1, the imaging lens of the embodiment includes a first lens L1 having positive refractive power, a second lens L2 having negative refractive power, a third lens L3 having positive refractive power, a fourth lens L4 having negative refractive power, and a fifth lens L5 having negative refractive power, arranged in the order from an object side to an image plane side. A filter 10 such as an infrared cut-off filter or a cover glass may be provided between the fifth lens L5 and an image plane IM. The filter 10 may be optionally omitted. Here, according to the imaging lens of this embodiment, there is provided an aperture stop on an object-side surface of the first lens L1.

According to the imaging lens of the embodiment, Abbe's numbers νd1 and νd3 to νd5 of the first lens and the lenses from the third lens L3 to the fifth lens L5 are respectively larger than 45, and an Abbe's number νd2 of the second lens L2 is smaller than 35. More specifically, the first lens L1 and the second lens L2 are made from a combination of low-dispersion material and a high-dispersion material, and each of the lenses from the third lens L3 to the fifth lens L5 is made of a low-dispersion material. With this arrangement of the Abbe's numbers, a chromatic aberration occurred in the first lens L1 is corrected by the second lens L2 and also satisfactorily corrected through each of the lenses from the third lens L3 to the fifth lens L5. In addition, since four of the five lenses from the first lens L1 to the fifth lens L5 are made of low-dispersion materials, generation of a chromatic aberration itself is suitably restrained. Here, more specifically, the Abbe's numbers νd1 to νd5 of the lenses from the first lens L1 to the fifth lens L5 are preferably restrained within ranges defined by the following conditional expressions, respectively. The imaging lenses of Numerical Data Examples 1 to 5 satisfy the following conditional expressions:

$$45<\nu d1<85$$

$$\nu d2<35$$

$$45<\nu d3<85$$

$$45<\nu d4<85$$

$$45<\nu d5<85$$

According to the imaging lenses in Numerical Data Examples 1 to 5 of this embodiment, the first lens L1 and each of the lenses from the third lens L3 to the fifth lens L5 have the same Abbe's number, and each lens is made of a same plastic material. For this reason, it is possible to suitably attain productivity improvement and manufacturing cost reduction of the imaging lens.

Furthermore, each of the lenses from the first lens L1 to the fifth lens L5 satisfies the following conditional expressions (1) and (2):

$$f1<f3 \text{ and } |f2|<f3 \quad (1)$$

$$f3<|f4| \text{ and } |f2|<|f5| \quad (2)$$

In the above conditional expressions:

f1: Focal length of a first lens L1 f2: Focal length of a second lens L2 f3: Focal length of a third lens L3 f4: Focal length of a fourth lens L4 f5: Focal length of a fifth lens L5

As described above, according to the imaging lens of this embodiment, the first lens L1 and the second lens L2, which are arranged on the object side in the imaging lens, have refractive powers that are stronger than those of other three lenses. Because of this, it is possible to attain miniaturization of the imaging lens and also suitably correct aberrations occurred in the first lens L1 and the second lens L2 through the respective lenses from the third lens L3 to the fifth lens L5, which have weak refractive powers.

According to the imaging lens having the above-described configuration, the first lens L1 is formed in a shape so that a curvature radius of an object-side surface thereof R1 and a curvature radius of an image plane-side surface thereof R2 are both positive, i.e. a shape of a meniscus lens directing a convex surface thereof to the object side near an optical axis X. Here, the shape of the first lens L1 is not limited to a shape of the meniscus lens directing a convex surface thereof to the object side near the optical axis X, and can be any as long as the curvature radius of the object-side surface thereof R1 is positive. More specifically, as a shape of the first lens L1, it is possible to form in a shape so that the curvature radius R1 is positive and the curvature radius R2 is negative, i.e. a shape of a biconvex lens near the optical axis X.

The second lens L2 is formed in a shape of a meniscus lens so that a curvature radius of an object-side surface thereof R3 and a curvature radius of an image plane-side surface thereof R4 are both positive and directs a convex surface thereof to the object side near the optical axis X. In addition, as described above, the second lens L2 is formed to satisfy the following conditional expressions (3) and (5). The second lens L2 and the first lens L1 are lenses having strong refractive powers among the lenses in the lens system. According to the embodiment, the first lens L1 and the second lens L2 satisfy the following conditional expression (4). When the imaging lens satisfies the conditional expression (4), it is possible to restrain Petzval sum of the whole lens system near zero and restrain an astigmatism, a field curvature, and a chromatic aberration within preferred ranges in a well-balanced manner.

$$-1.8<f2/f<-0.8 \quad (3)$$

$$-1.0<f1/f2<-0.4 \quad (4)$$

$$1.5<R2f/R2r<6.0 \quad (5)$$

In the above conditional expressions:

R2f: Curvature radius of an object-side surface of the second lens

R2r: Curvature radius of an image plane-side surface of the second lens

In order to more satisfactorily correct aberrations, the imaging lens preferably satisfies the following conditional expression (4A). The imaging lenses in Numerical Data Examples 1 to 5 satisfy the following conditional expression (4A):

$$-0.7<f1/f2<-0.4 \quad (4A)$$

On the other hand, the third lens L3 is formed in a shape so that a curvature radius of an object-side surface thereof R5 is positive and a curvature radius of an image plane-side surface R6 is negative, so as to have a shape of a biconvex lens near the optical axis X. Here, the shape of the third lens L3 is not limited to a shape of a biconvex lens near the optical axis X and can be any as long as it is formed in a shape so that the curvature radius of the object surface thereof R5 is positive. Numerical Data Examples 1 to 3 are examples in which the third lens L3 has a shape of a biconvex lens near the optical axis X. Numerical Data Examples 4 and 5 are examples in which the third lens L3 has a shape of a meniscus lens directing a convex surface thereof to the object side near the optical axis X.

The third lens L3 satisfies the following conditional expression (6). With this configuration, it is possible to more satisfactorily correct aberrations. The imaging lenses in Numerical Data Examples 1 to 5 satisfy the following conditional expression (6):

$$5.0<f3/f<20.0 \quad (6)$$

The fourth lens L4 is formed in a shape so that a curvature radius of an object-side surface thereof R7 and a curvature radius of an image plane-side surface thereof R8 are both negative, i.e. a shape of a meniscus lens directing a concave surface thereof to the object side near the optical axis X. As described above, the second lens L2 is formed in a shape of a meniscus lens directing a convex surface thereof to the object side near the optical axis X. Forming the fourth lens L4 in a shape of a meniscus lens directing a concave surface thereof to the object side near the optical axis X, the second lens L2 and the fourth lens L4 are arranged directing their concave surfaces to the third lens L3. Therefore, aberrations occurred in the first lens L1 are suitably corrected by the negative-positive-negative refractive power arrangement of the lenses from the second lens L2 to the fourth lens L4 and the shapes of the respective lens surfaces of the second lens L2 and the fourth lens L4.

The third lens L3 and the fourth lens L4 mainly serve for correcting aberrations. According to the imaging lens of this embodiment, restraining the sag (sagittal height) of each lens surface of the third lens L3 and the fourth lens L4 within certain range, aberrations are satisfactorily corrected. More specifically, when the maximum effective diameter of the object-side surface of the third lens L3 is $\Phi_{3A}$, the maximum effective diameter of the image plane-side surface thereof is $\Phi_{3B}$, the maximum effective diameter of the object-side surface of the fourth lens L4 is $\Phi_{4A}$, the maximum effective diameter of the image plane-side surface thereof is $\Phi_{4B}$, and the maximum absolute value of a sag at up to 70% of the maximum effective diameters $\Phi_{3A}$ to $\Phi_{4B}$ is $Z_{0.7}$, the imaging lens having the above-described configuration preferably satisfies the following conditional expression (7). The imaging lenses of Numerical Data Examples 1 to 5 satisfy the conditional expression (7):

$$Z_{0.7}/f<0.1 \quad (7)$$

With the maximum sags being restrained below the upper limit of the conditional expression (7), the third lens L3 and the fourth lens L4 have substantially uniform thicknesses in a direction of the optical axis X, and thereby have less curved shapes. With such lens shapes, aberrations are more satisfactorily corrected. Furthermore, sensitivity to deterioration of the image-forming performance due to decentering (axial displacement), tilting, or the like upon manufacturing the imaging lens, i.e. so-called "production error sensitivity" decreases. In addition, because of the substantially uniform thickness in the optical axis direction, fabrication properties upon production are improved and manufacturing cost of the imaging lens can be restrained. Here, "sag" means, in each surface, a distance in a direction parallel to the optical axis X from a tangential plane that is orthogonal to the optical axis X to the surface.

Here, each of lenses from the second lens L2 to the fourth lens L4 satisfies the following conditional expressions (8) and (9). With this configuration, aberrations are more satisfactorily corrected. In addition, since the maximum emitting angle of an off-axis light beam is kept small, generation of the shading phenomenon is restrained.

$$5.0<f34/f<25.0 \quad (8)$$

$$0.3<dA/dB<1.5 \quad (9)$$

In the above conditional expressions:

f34: Composite focal length of the third lens L3 and the fourth lens L4 dA: Distance on an optical axis from an image plane-side surface of the second lens L2 to an object-side surface of the third lens L3 dB: Distance on an optical axis from an image plane-side surface of the third lens L3 to an object-side surface of the fourth lens L4

The fifth lens L5 is formed in a shape so that a curvature radius of an object-side surface thereof R9 and a curvature radius of an image plane-side surface thereof R10 are both positive, so as to have a shape of a meniscus lens directing a convex surface thereof to the object side near the optical axis X. In addition, an image plane-side surface of the fifth lens L5 is formed as an aspheric shape so as to be convex to the object side near the optical axis X and concave to the object side at the periphery. With such shape of the fifth lens L5, it is possible to suitably restrain an incident angle of a light beam emitted from the imaging lens to the image plane IM.

Here, it is not necessary to satisfy all of the conditional expressions (1) to (9) and (4A), and it is possible to obtain an effect corresponding to the respective conditional expression when any single one of the conditional expressions is individually satisfied.

In the embodiment, each lens has lens surfaces that are formed to be an aspheric surface. When the aspheric surfaces applied to the lens surfaces have an axis Z in the optical axis direction, a height H in a direction perpendicular to the optical axis, a conical coefficient k, and aspheric coefficients $A_4$, $A_6$, $A_8$, $A_{10}$, $A_{12}$, $A_{14}$, and $A_{16}$, a shape of the aspheric surfaces of the lens surfaces may be expressed as follows:

[Formula 1]

$$Z = \frac{\frac{H^2}{R}}{1+\sqrt{1-(k+1)\frac{H^2}{R^2}}} + A_4H^4 + A_6H^6 + A_8H^8 + A_{10}H^{10} + A_{12}H^{12} + A_{14}H^{14} + A_{16}H^{16}$$

Next, Numerical Data Examples of the imaging lens of the embodiment will be described. In each Numerical Data Example, f represents a focal length of the whole lens system, Fno represents an F number, and ω represents a half angle of view, respectively. In addition, i represents a surface number counted from the object side, R represents a curvature radius, d represents a distance between lens surfaces (surface spacing) on the optical axis, Nd represents a refractive index for a d line (a reference wavelength in this embodiment), and νd represents the Abbe's number for the d line, respectively. Here, aspheric surfaces are indicated with surface numbers i affixed with * (asterisk).

NUMERICAL DATA EXAMPLE 1

Basic lens data are shown below.
f = 3.75 mm, Fno = 2.4, ω = 34.2°
Unit: mm

Surface Data

| Surface Number i | R | d | Nd | νd |
|---|---|---|---|---|
| (Object) | ∞ | ∞ | | |
| 1* (Stop) | 1.494 | 0.554 | 1.5346 | 56.0(=νd1) |
| 2* | 15.307 | 0.055 | | |
| 3* | 4.867(=R2f) | 0.295 | 1.6354 | 23.9(=νd2) |
| 4* | 2.081(=R2r) | 0.395(=dA) | | |
| 5* | 199.951 | 0.443 | 1.5346 | 56.0(=νd3) |
| 6* | −13.687 | 0.479(=dB) | | |
| 7* | −5.445 | 0.352 | 1.5346 | 56.0(=νd4) |
| 8* | −5.735 | 0.050 | | |
| 9* | 1.429 | 0.690 | 1.5346 | 56.0(=νd5) |
| 10* | 1.179 | 0.230 | | |
| 11 | ∞ | 0.300 | 1.5163 | 64.1 |
| 12 | ∞ | 0.671 | | |
| (Image plane) | ∞ | | | |

Aspheric Surface Data

First Surface $k = 0.000, A_4 = -2.232E-03, A_6 = -4.156E-02, A_8 = 1.146E-01, A_{10} = -1.020E-01$ Second Surface $k = 0.000, A_4 = -2.852E-01, A_6 = 7.759E-01, A_8 = -9.391E-01, A_{10} = 3.755E-01$ Third Surface $k = 0.000, A_4 = -3.709E-01, A_6 = 1.044, A_8 = -1.322, A_{10} = 6.076E-01$ Fourth Surface $k = 0.000, A_4 = -1.733E-01, A_6 = 5.688E-01, A_8 = -7.018E-01, A_{10} = 3.827E-01$ Fifth Surface $k = 0.000, A_4 = 2.063E-01, A_6 = 1.702E-01, A_8 = -1.919E-01, A_{10} = 1.962E-01, A_{12} = -3.889E-02, A_{14} = -7.757E-02, A_{16} = 7.712E-02$ Sixth Surface $k = 0.000, A_4 = -1.502E-01, A_6 = 7.633E-02, A_8 = -2.745E-01, A_{10} = 4.997E-01, A_{12} = -4.127E-01, A_{14} = 1.599E-01, A_{16} = -1.374E-02$ Seventh Surface $k = 0.000, A_4 = 3.640E-01, A_6 = -4.621E-01, A_8 = 3.053E-01, A_{10} = -1.135E-01, A_{12} = -4.504E-03, A_{14} = 1.468E-02, A_{16} = -2.511E-03$ Eighth Surface $k = 0.000, A_4 = 7.839E-02, A_6 = 3.330E-02, A_8 = -7.131E-02, A_{10} = 3.114E-02, A_{12} = -7.637E-03, A_{14} = 1.613E-03, A_{16} = -2.096E-04$ Ninth Surface $k = -1.189, A_4 = -4.505E-01, A_6 = 2.283E-01, A_8 = -5.421E-02, A_{10} = 2.224E-03, A_{12} = 1.448E-03, A_{14} = -1.660E-04, A_{16} = -1.344E-05$ Tenth Surface $k = -2.993, A_4 = -2.108E-01, A_6 = 1.146E-01, A_8 = -4.590E-02, A_{10} = 1.134E-02, A_{12} = -1.666E-03, A_{14} = 1.401E-04, A_{16} = -6.057E-06$ f1 = 3.06 mm
f2 = −5.97 mm -continued Basic lens data are shown below.
f = 3.75 mm, Fno = 2.4, ω = 34.2°
Unit: mm f3 = 23.98 mm
f4 = −349.61 mm
f5 = −319.33 mm
f34 = 26.31 mm
$Z_{0.7}$ = 0.064 mm The values of the respective conditional expressions are as follows:

f2/f=−1.59 f1/f2=−0.51

R2f/R2r=2.34 f3/f=6.39

$Z_{0.7}$/f=0.017 f34/f=7.02 dA/dB=0.82

Accordingly, the imaging lens of Numerical Data Example 1 satisfies the above-described conditional expressions. A distance on the optical axis from an object-side surface of the first lens L1 to an image plane IM (the thickness of the filter 10 is a length in air, which is hereinafter the same) is 4.41 mm, and miniaturization of the imaging lens is suitably attained.

Figure 2:
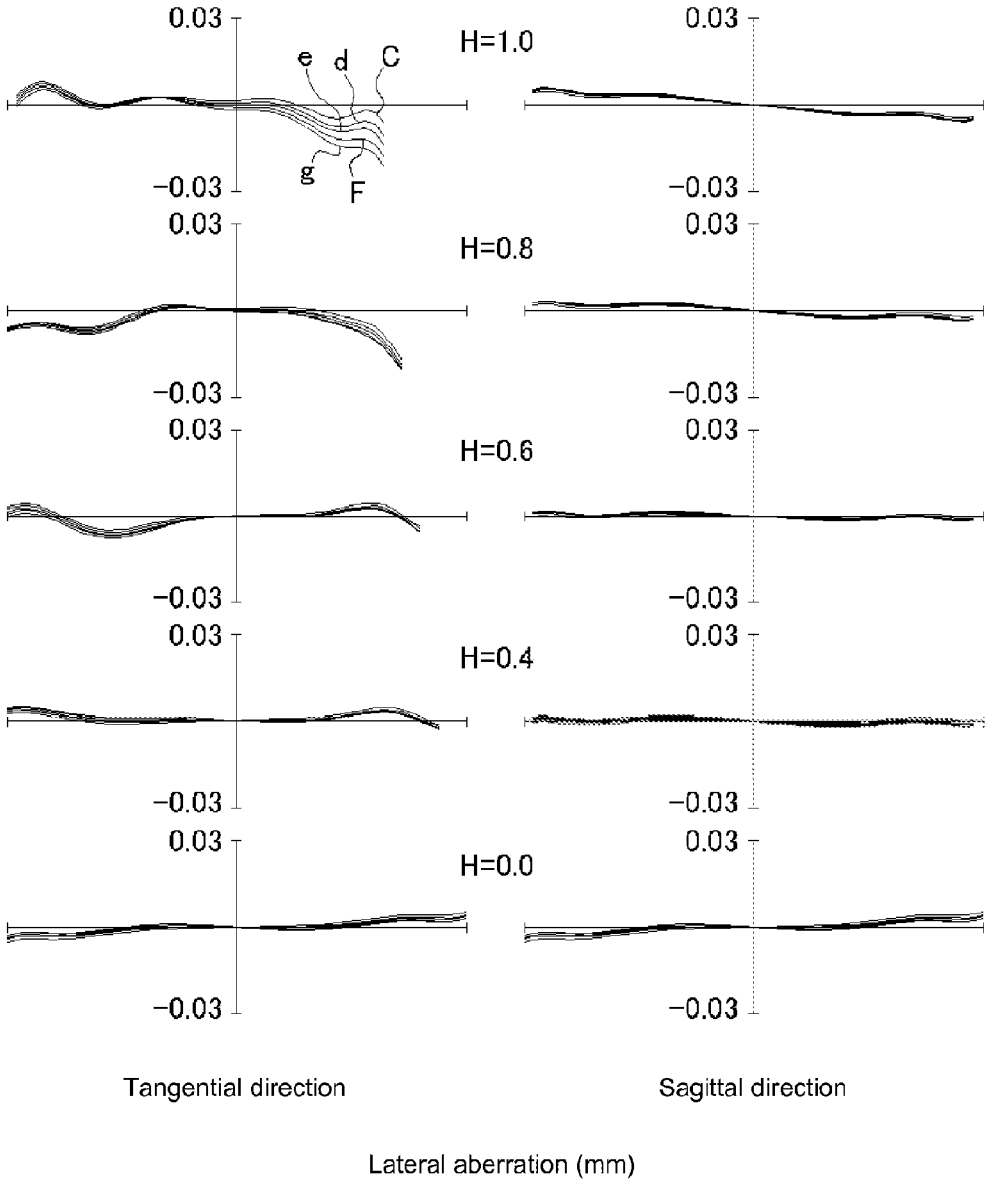
FIG. 2 is an aberration diagram showing a lateral aberration of the imaging lens of FIG. 1.
Figure 3:
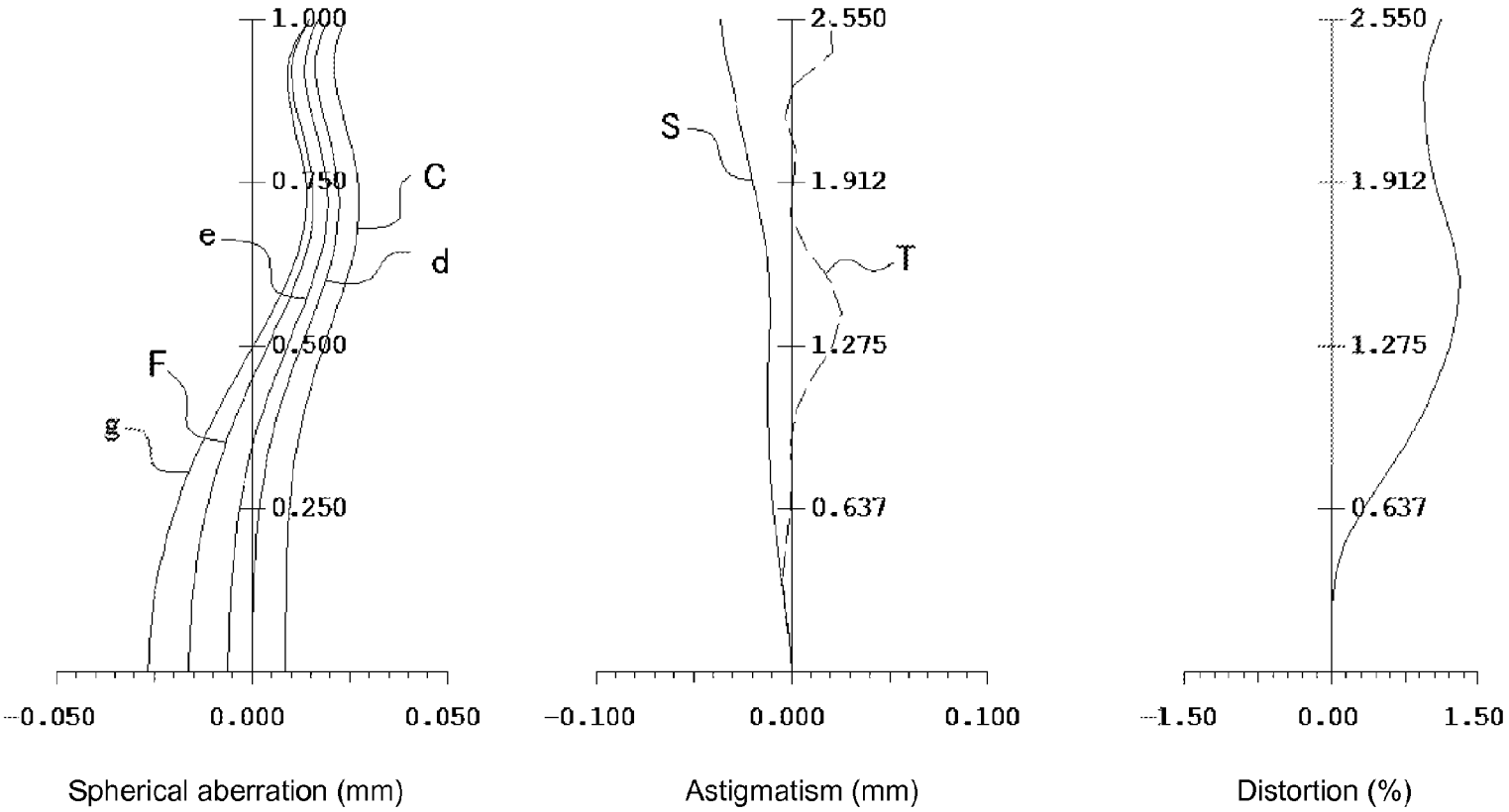
FIG. 3 is an aberration diagram showing a spherical aberration, an astigmatism, and a distortion of the imaging lens of FIG. 1.
Figure 4:
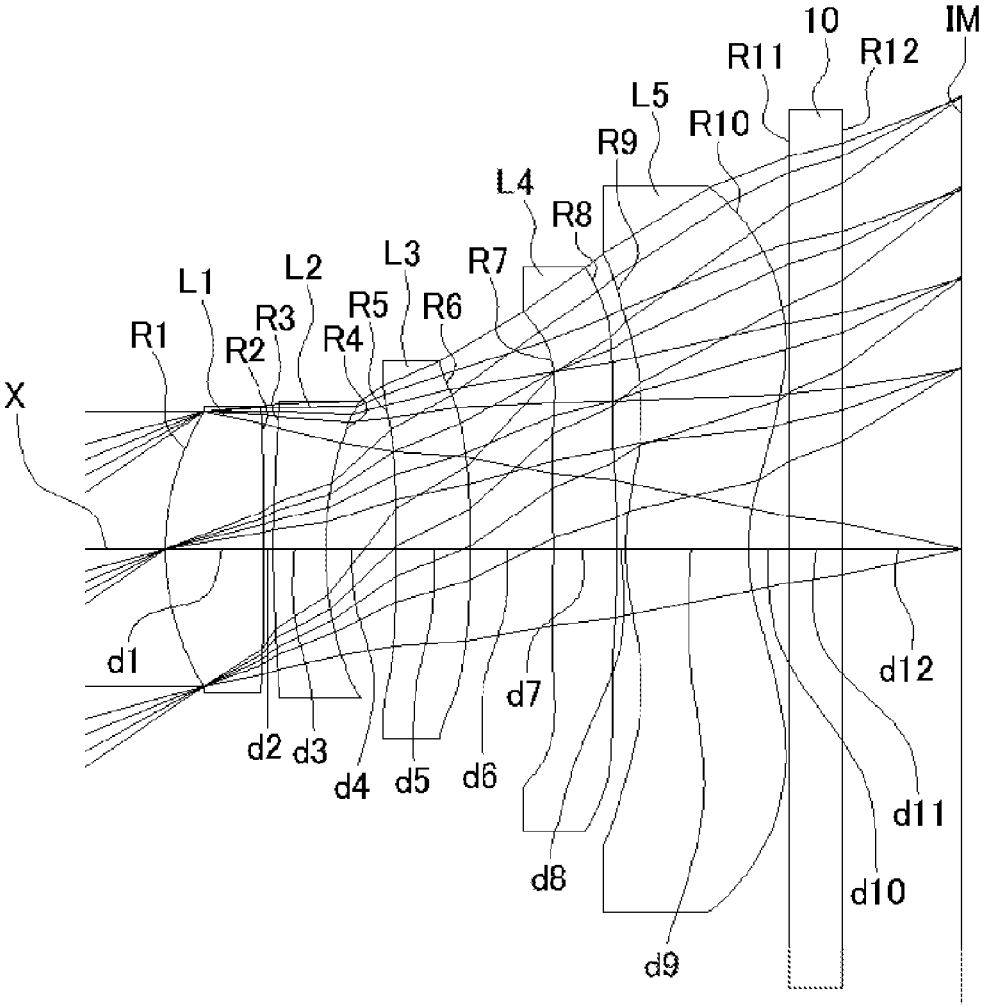
FIG. 4 is a sectional view showing a schematic configuration of an imaging lens of Numerical Data Example 2 according to the embodiment of the invention.

FIG. 2 shows the lateral aberration that corresponds to a ratio H of each image height to the maximum image height (hereinafter referred to as "image height ratio H") in the imaging lens of Numerical Data Example 1, which is divided into a tangential direction and sagittal direction (which is also the same in FIGS. 5, 8, 11, and 14). Furthermore, FIG. 3 shows a spherical aberration (mm), an astigmatism (mm), and a distortion (%) of the imaging lens of Numerical Data Example 1, respectively. In the aberration diagrams, for the lateral aberration diagrams and spherical aberration diagrams, aberrations at each wavelength, i.e. a g line (435.84 nm), an F line (486.13 nm), an e line (546.07 nm), a d line (587.56 nm), and a C line (656.27 nm), are indicated. In the astigmatism diagram, the aberrations on a sagittal image surface S and on a tangential image surface T are respectively indicated (which are the same in FIGS. 6, 9, 12, and 15). As shown in FIGS. 2 and 3, in the imaging lens of Numerical Data Example 1, the aberrations are satisfactorily corrected.

NUMERICAL DATA EXAMPLE 2

Basic lens data are shown below.
f = 3.77 mm, Fno = 2.4, ω = 34.1°
Unit: mm

Surface Data

| Surface Number i | R | d | Nd | νd |
|---|---|---|---|---|
| (Object) | ∞ | ∞ | | |
| 1* (Stop) | 1.493 | 0.556 | 1.5346 | 56.0(=νd1) |

-continued

Basic lens data are shown below.
f = 3.77 mm, Fno = 2.4, ω = 34.1°
Unit: mm

| | | | | |
|---|---|---|---|---|
| 2* | 14.784 | 0.056 | | |
| 3* | 4.729(=R2f) | 0.300 | 1.6142 | 25.6(=νd2) |
| 4* | 2.007(=R2r) | 0.397(=dA) | | |
| 5* | 108.743 | 0.421 | 1.5346 | 56.0(=νd3) |
| 6* | −14.924 | 0.476(=dB) | | |
| 7* | −5.091 | 0.360 | 1.5346 | 56.0(=νd4) |
| 8* | −5.369 | 0.050 | | |
| 9* | 1.418 | 0.698 | 1.5346 | 56.0(=νd5) |
| 10* | 1.165 | 0.230 | | |
| 11 | ∞ | 0.300 | 1.5163 | 64.1 |
| 12 | ∞ | 0.678 | | |
| (Image plane) | ∞ | | | |

Aspheric Surface Data

First Surface $k = 0.000, A_4 = -1.255E-03, A_6 = -4.129E-02, A_8 = 1.132E-01, A_{10} = -1.049E-01$ Second Surface $k = 0.000, A_4 = -2.825E-01, A_6 = 7.723E-01, A_8 = -9.440E-01, A_{10} = 3.726E-01$ Third Surface $k = 0.000, A_4 = -3.734E-01, A_6 = 1.044, A_8 = -1.323, A_{10} = 6.032E-01$ Fourth Surface $k = 0.000, A_4 = -1.717E-01, A_6 = 5.707E-01, A_8 = -6.998E-01, A_{10} = 3.844E-01$ Fifth Surface $k = 0.000, A_4 = -2.054E-01, A_6 = 1.713E-01, A_8 = -1.914E-01, A_{10} = 1.958E-01, A_{12} = -3.960E-02, A_{14} = -7.774E-02, A_{16} = 7.858E-02$ Sixth Surface $k = 0.000, A_4 = -1.524E-01, A_6 = 7.643E-02, A_8 = -2.748E-01, A_{10} = 4.993E-01, A_{12} = -4.129E-01, A_{14} = 1.599E-01, A_{16} = -1.368E-02$ Seventh Surface $k = 0.000, A_4 = 3.640E-01, A_6 = -4.616E-01, A_8 = 3.053E-01, A_{10} = -1.136E-01, A_{12} = -4.529E-03, A_{14} = 1.468E-02, A_{16} = -2.504E-03$ Eighth Surface $k = 0.000, A_4 = 7.910E-02, A_6 = 3.361E-02, A_8 = -7.125E-02, A_{10} = 3.114E-02, A_{12} = -7.641E-03, A_{14} = 1.611E-03, A_{16} = -2.105E-04$ Ninth Surface $k = -1.185, A_4 = -4.504E-01, A_6 = 2.282E-01, A_8 = -5.422E-02, A_{10} = 2.221E-03, A_{12} = 1.447E-03, A_{14} = -1.663E-04, A_{16} = -1.361E-05$ Tenth Surface $k = -3.044, A_4 = -2.102E-01, A_6 = 1.146E-01, A_8 = -4.589E-02, A_{10} = 1.134E-02, A_{12} = -1.666E-03, A_{14} = 1.401E-04, A_{16} = -6.063E-06$ f1 = 3.06 mm
f2 = −5.92 mm
f3 = 24.58 mm
f4 = −334.74 mm
f5 = 315.43 mm
f34 = 27.16 mm
$Z_{0.7}$ = 0.063 mm The values of the respective conditional expressions are as follows:

f2/f=−1.57 f1/f2=−0.52

R2f/R2r=2.36 f3/f=6.52

$Z_{0.7}$/f=0.017 f34/f=7.20 dA/dB=0.83

Accordingly, the imaging lens of Numerical Data Example 2 satisfies the above-described conditional expressions. A distance on the optical axis from an object-side surface of the first lens L1 to the image plane IM is 4.42 mm, and miniaturization of the imaging lens is suitably attained.

Figure 5:
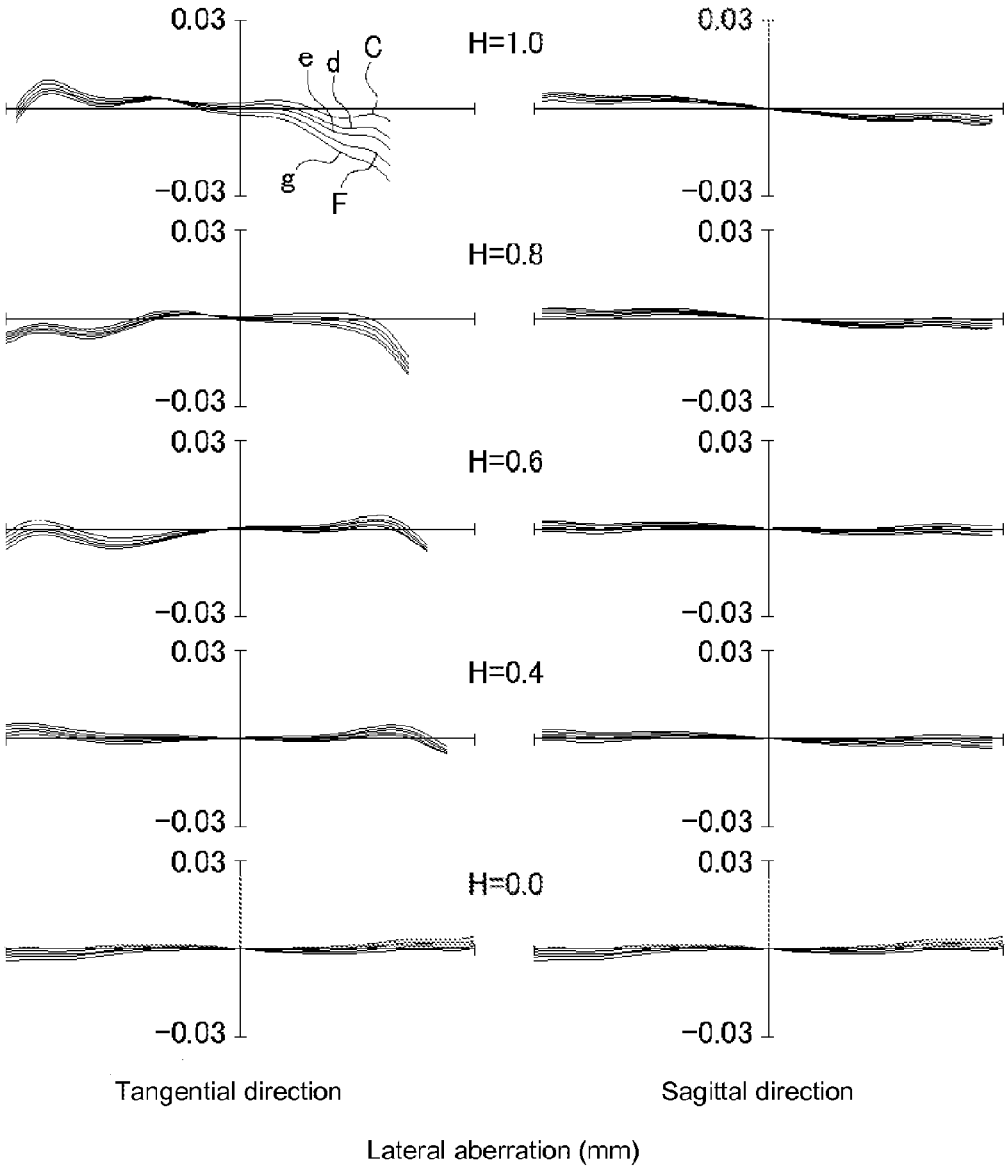
FIG. 5 is an aberration diagram showing a lateral aberration of the imaging lens of FIG. 4.
Figure 6:
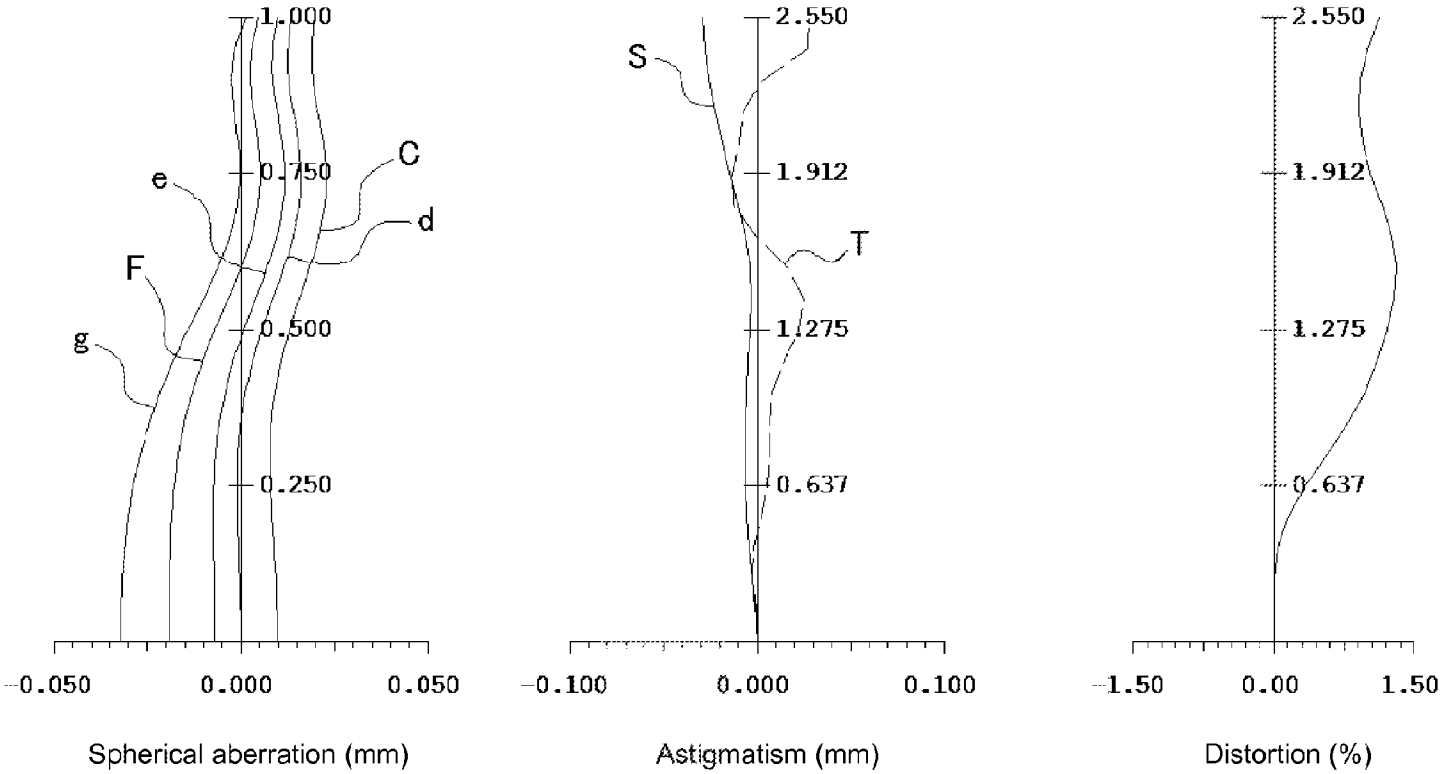
FIG. 6 is an aberration diagram showing a spherical aberration, an astigmatism, and a distortion of the imaging lens of FIG. 4.
Figure 7:
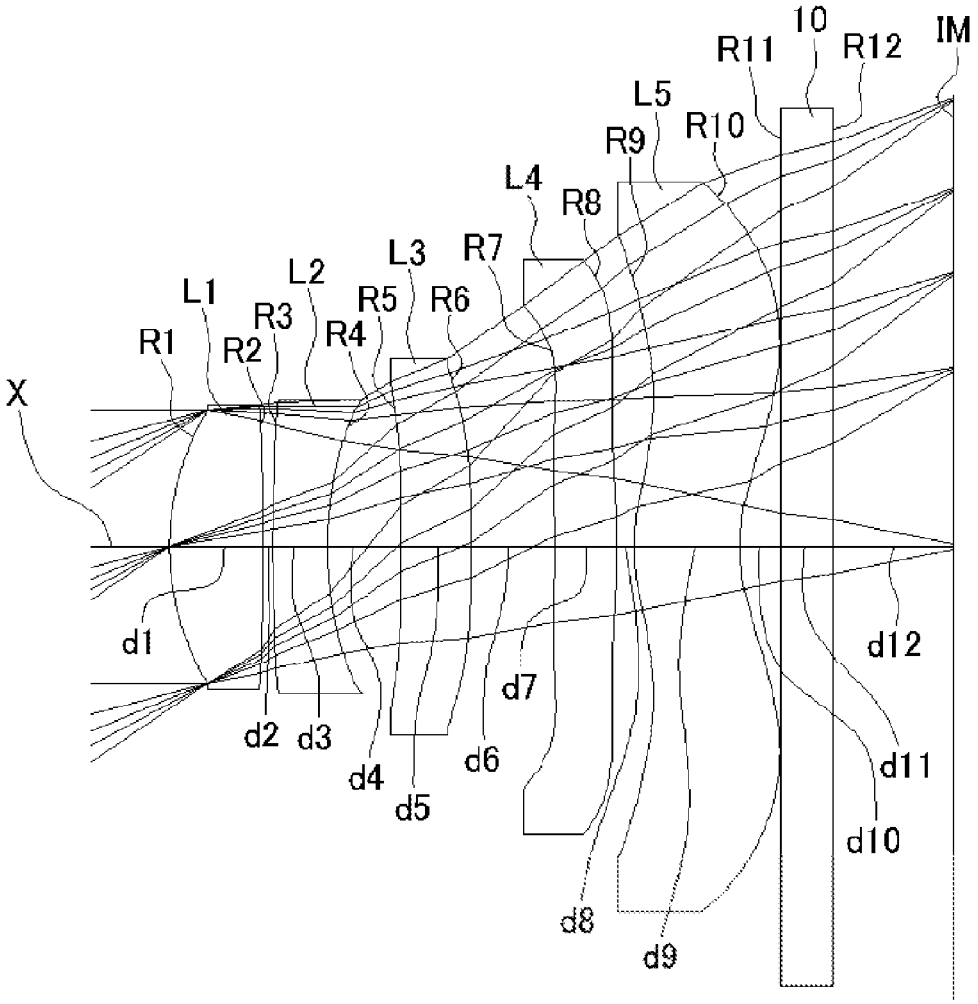
FIG. 7 is a sectional view showing a schematic configuration of an imaging lens of Numerical Data Example 3 according to the embodiment of the invention.

FIG. 5 shows the lateral aberration that corresponds to the image height ratio H, and FIG. 6 shows a spherical aberration (mm), an astigmatism (mm), and a distortion (%), respectively, in the imaging lens of Numerical Data Example 2. As shown in FIGS. 5 and 6, also in the imaging lens of Numerical Data Example 2, the image surface is satisfactorily corrected and the aberrations are suitably corrected similarly to Numerical Data Example 1.

NUMERICAL DATA EXAMPLE 3

Basic lens data are shown below.
f = 3.75 mm, Fno = 2.4, ω = 33.7°
Unit: mm

Surface Data

| Surface Number i | R | d | Nd | νd |
|---|---|---|---|---|
| (Object) | ∞ | ∞ | | |
| 1* (Stop) | 1.469 | 0.529 | 1.5346 | 56.0(=νd1) |
| 2* | 17.604 | 0.057 | | |
| 3* | 5.107(=R2f) | 0.311 | 1.6142 | 25.6(=νd2) |
| 4* | 1.967(=R2r) | 0.416(=dA) | | |
| 5* | 17.450 | 0.397 | 1.5346 | 56.0(=νd3) |
| 6* | −30.875 | 0.475(=dB) | | |
| 7* | −4.948 | 0.355 | 1.5346 | 56.0(=νd4) |
| 8* | −5.213 | 0.100 | | |
| 9* | 1.293 | 0.600 | 1.5346 | 56.0(=νd5) |
| 10* | 1.078 | 0.230 | | |
| 11 | ∞ | 0.300 | 1.5163 | 64.1 |
| 12 | ∞ | 0.679 | | |
| (Image plane) | ∞ | | | |

Aspheric Surface Data

First Surface $k = 0.000, A_4 = -8.828E-03, A_6 = -3.600E-02, A_8 = 9.073E-02, A_{10} = -1.009E-01$ Second Surface $k = 0.000, A_4 = -3.033E-01, A_6 = 7.653E-01, A_8 = -9.313E-01, A_{10} = 4.154E-01$ Third Surface $k = 0.000, A_4 = -3.902E-01, A_6 = 1.046, A_8 = -1.308, A_{10} = 6.546E-01$ Fourth Surface $k = 0.000, A_4 = -1.685E-01, A_6 = 5.385E-01, A_8 = -6.571E-01, A_{10} = 3.751E-01$ Fifth Surface $k = 0.000, A_4 = -2.018E-01, A_6 = 1.608E-01, A_8 = -1.860E-01, A_{10} = 1.964E-01, A_{12} = -4.170E-02, A_{14} = -8.252E-02, A_{16} = 7.450E-02$ -continued Basic lens data are shown below.
f = 3.75 mm, Fno = 2.4, ω = 33.7°
Unit: mm Sixth Surface $k = 0.000, A_4 = -1.444E-01, A_6 = 7.709E-02, A_8 = -2.736E-01,$
$A_{10} = 5.001E-01, A_{12} = 4.125E-01, A_{14} = 1.604E-01, A_{16} = -1.293E-02$ Seventh Surface $k = 0.000, A_4 = 3.633E-01, A_6 = -4.604E-01, A_8 = 3.078E-01,$
$A_{10} = -1.143E-01, A_{12} = -4.492E-03, A_{14} = 1.475E-02,$
$A_{16} = -2.511E-03$ Eighth Surface $k = 0.000, A_4 = 8.745E-02, A_6 = 3.309E-02, A_8 = -7.145E-02,$
$A_{10} = 3.112E-02, A_{12} = -7.667E-03, A_{14} = 1.606E-03,$
$A_{16} = -2.108E-04$ Ninth Surface $k = -1.169, A_4 = -4.523E-01, A_6 = 2.282E-01, A_8 = -5.435E-02,$
$A_{10} = 2.186E-03, A_{12} = 1.437E-03, A_{14} = -1.637E-04,$
$A_{16} = -1.044E-05$ Tenth Surface $k = -3.124, A_4 = -2.106E-01, A_6 = 1.146E-01, A_8 = -4.588E-02,$
$A_{10} = 1.135E-02, A_{12} = -1.663E-03, A_{14} = 1.403E-04,$
$A_{16} = -6.224E-06$ f1 = 2.96 mm
f2 = −5.41 mm
f3 = 20.91 mm
f4 = −338.97 mm
f5 = −402.36 mm
f34 = 22.82 mm
$Z_{0.7} = 0.050$ mm The values of the respective conditional expressions are as follows:

f2/f=−1.44 f1/f2=−0.55

R2f/R2r=2.60 f3/f=5.58

$Z_{0.7}/f=0.013$ f34/f=6.09 dA/dB=0.88

Accordingly, the imaging lens of Numerical Data Example 3 satisfies the above-described conditional expressions. A distance on the optical axis from an object-side surface of the first lens L1 to the image plane IM is 4.35 mm, and miniaturization of the imaging lens is suitably attained.

Figure 8:
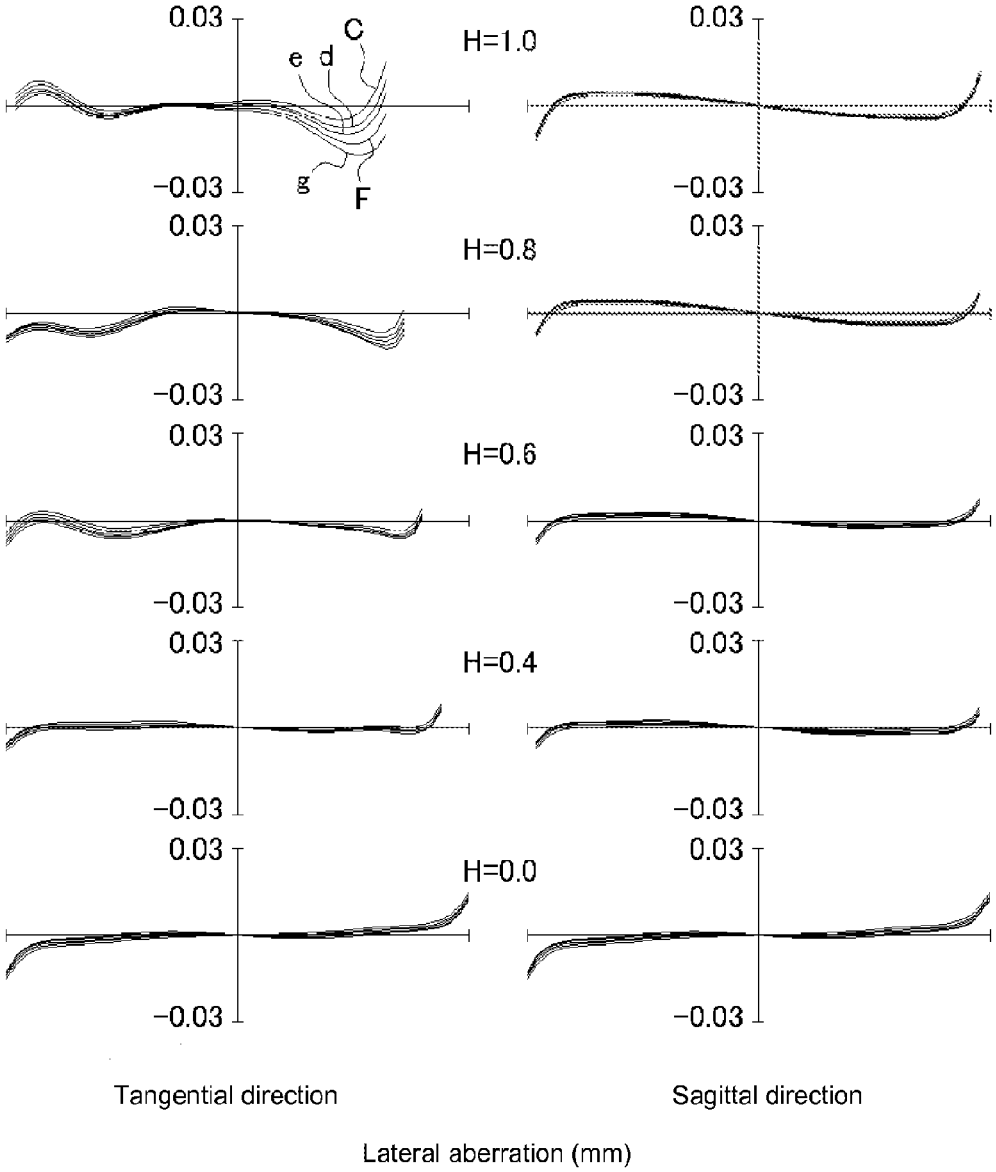
FIG. 8 is an aberration diagram showing a lateral aberration of the imaging lens of FIG. 7.
Figure 9:
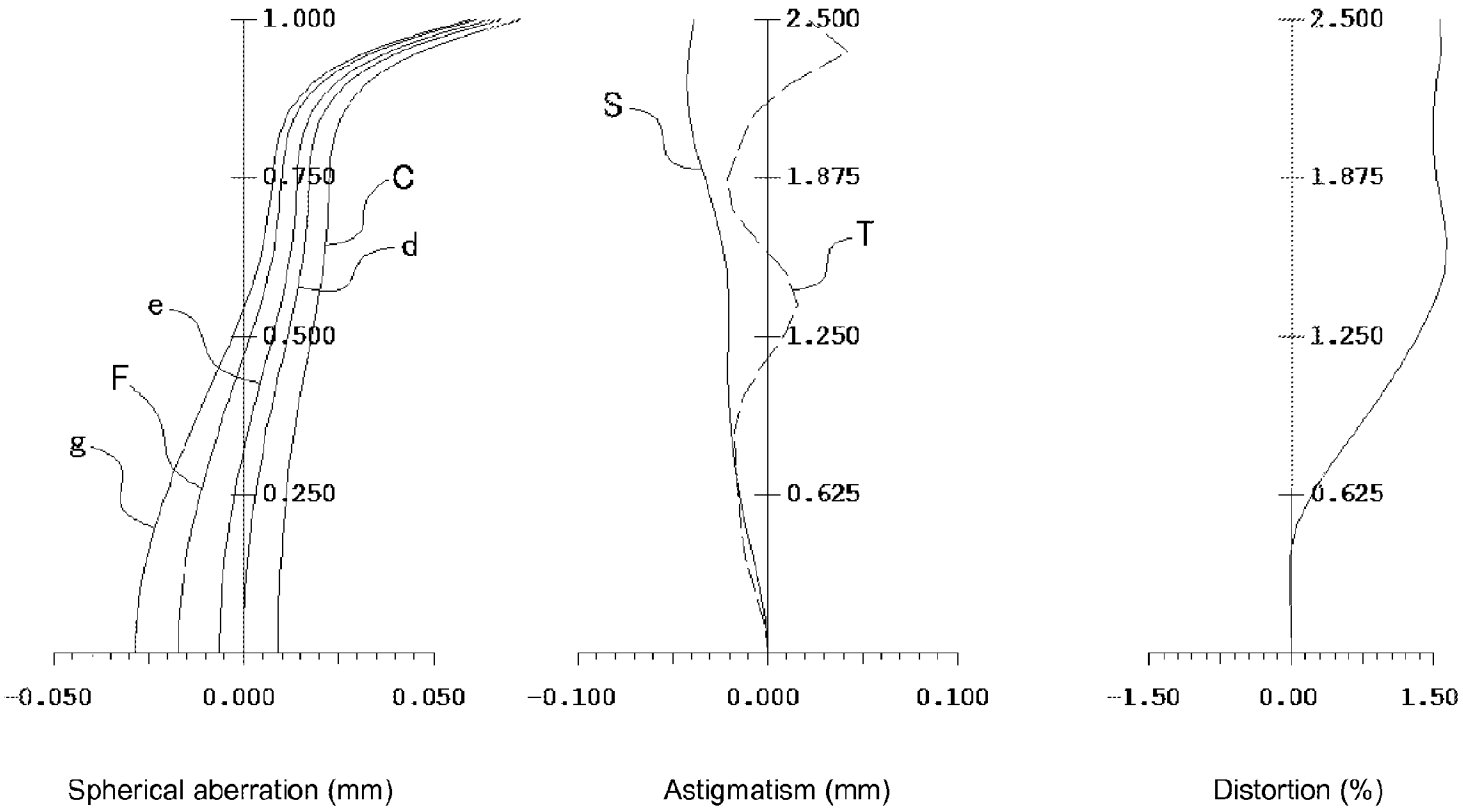
FIG. 9 is an aberration diagram showing a spherical aberration, an astigmatism, and a distortion of the imaging lens of FIG. 7.
Figure 10:
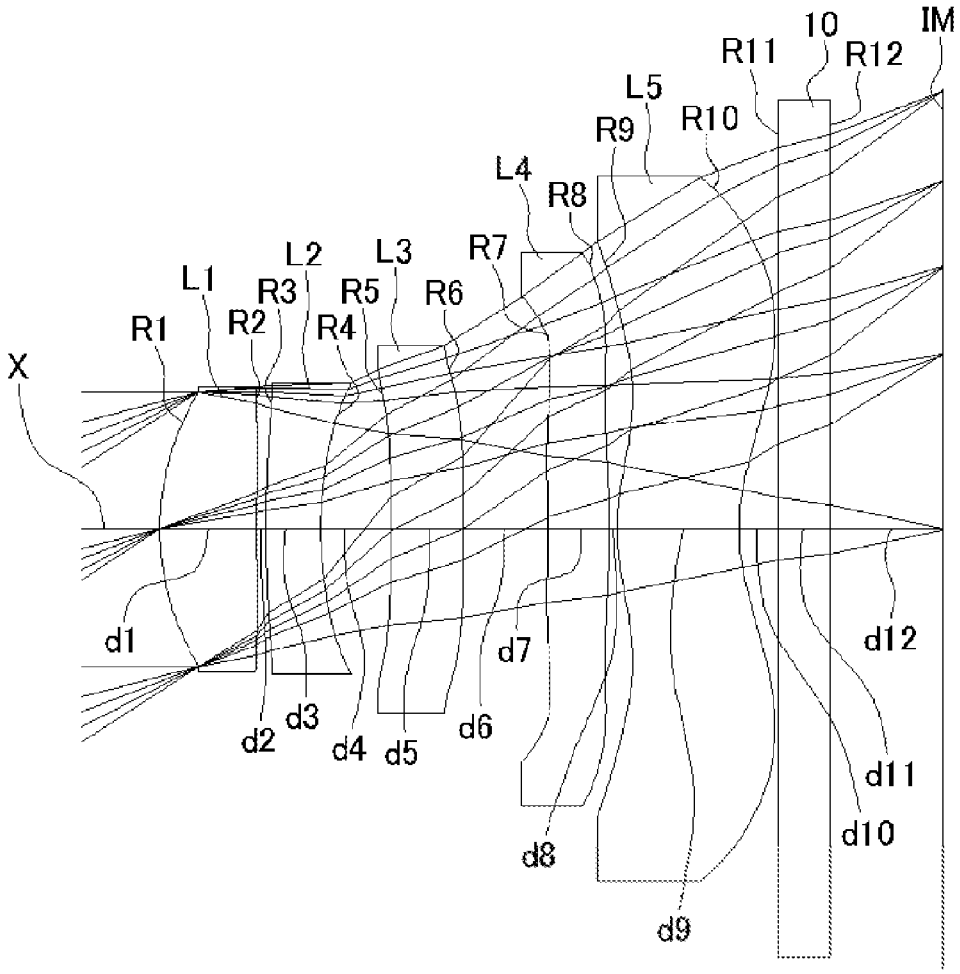
FIG. 10 is a sectional view showing a schematic configuration of an imaging lens of Numerical Data Example 4 according to an embodiment of the invention.

FIG. 8 shows the lateral aberration that corresponds to the image height ratio H, and FIG. 9 shows a spherical aberration (mm), an astigmatism (mm), and a distortion (%), respectively, in the imaging lens of Numerical Data Example 3. As shown in FIGS. 8 and 9, also in the imaging lens of Numerical Data Example 3, the image surface is satisfactorily corrected and the aberrations are suitably corrected similarly to Numerical Data Example 1.

NUMERICAL DATA EXAMPLE 4

Basic lens data are shown below.
f = 3.85 mm, Fno = 2.4, ω = 33.0°
Unit: mm

Surface Data

| Surface Number i | R | d | Nd | νd |
|---|---|---|---|---|
| (Object) | ∞ | ∞ | | |
| 1* (Stop) | 1.496 | 0.563 | 1.5346 | 56.0(=νd1) |
| 2* | 11.052 | 0.054 | | |
| 3* | 4.359(=R2f) | 0.318 | 1.6354 | 23.9(=νd2) |
| 4* | 2.129(=R2r) | 0.403(=dA) | | |
| 5* | 25.104 | 0.428 | 1.5346 | 56.0(=νd3) |
| 6* | 100.397 | 0.488(=dB) | | |
| 7* | −5.675 | 0.357 | 1.5346 | 56.0(=νd4) |
| 8* | −5.990 | 0.050 | | |
| 9* | 1.432 | 0.706 | 1.5346 | 56.0(=νd5) |
| 10* | 1.176 | 0.230 | | |
| 11 | ∞ | 0.300 | 1.5163 | 64.1 |
| 12 | ∞ | 0.655 | | |
| (Image plane) | ∞ | | | |

Aspheric Surface Data

First Surface $k = 0.000, A_4 = -2.168E-03, A_6 = -4.526E-02, A_8 = 1.120E-01,$
$A_{10} = -1.002E-01$ Second Surface $k = 0.000, A_4 = -2.877E-01, A_6 = 7.705E-01, A_8 = -9.423E-01,$
$A_{10} = 3.788E-01$ Third Surface $k = 0.000, A_4 = -3.725E-01, A_6 = 1.047, A_8 = -1.321, A_{10} = 6.019E-01$ Fourth Surface $k = 0.000, A_4 = -1.760E-01, A_6 = 5.612E-01, A_8 = -7.063E-01,$
$A_{10} = 3.859E-01$ Fifth Surface $k = 0.000, A_4 = -2.054E-01, A_6 = 1.634E-01, A_8 = -1.966E-01,$
$A_{10} = 1.934E-01, A_{12} = -4.027E-02, A_{14} = -7.780E-02,$
$A_{16} = 7.807E-02$ Sixth Surface $k = 0.000, A_4 = -1.488E-01, A_6 = 8.112E-02, A_8 = -2.722E-01,$
$A_{10} = 5.006E-01, A_{12} = -4.126E-01, A_{14} = 1.597E-01,$
$A_{16} = -1.423E-02$ Seventh Surface $k = 0.000, A_4 = 3.653E-01, A_6 = -4.620E-01, A_8 = 3.053E-01,$
$A_{10} = -1.135E-01, A_{12} = -4.476E-03, A_{14} = 1.471E-02,$
$A_{16} = -2.496E-03$ Eighth Surface $k = 0.000, A_4 = 7.807E-02, A_6 = 3.337E-02, A_8 = -7.124E-02,$
$A_{10} = 3.117E-02, A_{12} = -7.628E-03, A_{14} = 1.616E-03,$
$A_{16} = -2.088E-04$ Ninth Surface $k = -1.190, A_4 = -4.506E-01, A_6 = 2.282E-01, A_8 = -5.418E-02,$
$A_{10} = 2.248E-03, A_{12} = 1.456E-03, A_{14}, = -1.640E-04,$
$A_{16} = -1.308E-05$ Tenth Surface $k = -3.033, A_4 = -2.109E-01, A_6 = 1.145E-01, A_8 = -4.591E-02,$
$A_{10} = 1.134E-02, A_{12} = -1.665E-03, A_{14} = 1.403E-04,$
$A_{16} = -6.039E-06$ f1 = 3.17 mm
f2 = −6.93 mm -continued

| Basic lens data are shown below. f = 3.85 mm, Fno = 2.4, ω = 33.0° Unit: mm |
|---|
| f3 = 62.49 mm<br>f4 = −334.24 mm<br>f5 = −311.61 mm<br>f34 = 78.62 mrn<br>$Z_{0.7}$ = 0.039 mm |

The values of the respective conditional expressions are as follows:

f2/f=−1.80 f1/f2=−0.46

R2f/R2r=2.05 f3/f=16.23

$Z_{0.7}$/f=0.010 f34/f=20.42 dA/dB=0.83

Accordingly, the imaging lens of Numerical Data Example 4 satisfies the above-described conditional expressions. A distance on the optical axis from an object-side surface of the first lens L1 to the image plane IM is 4.45 mm, and miniaturization of the imaging lens is suitably attained.

Figure 11:
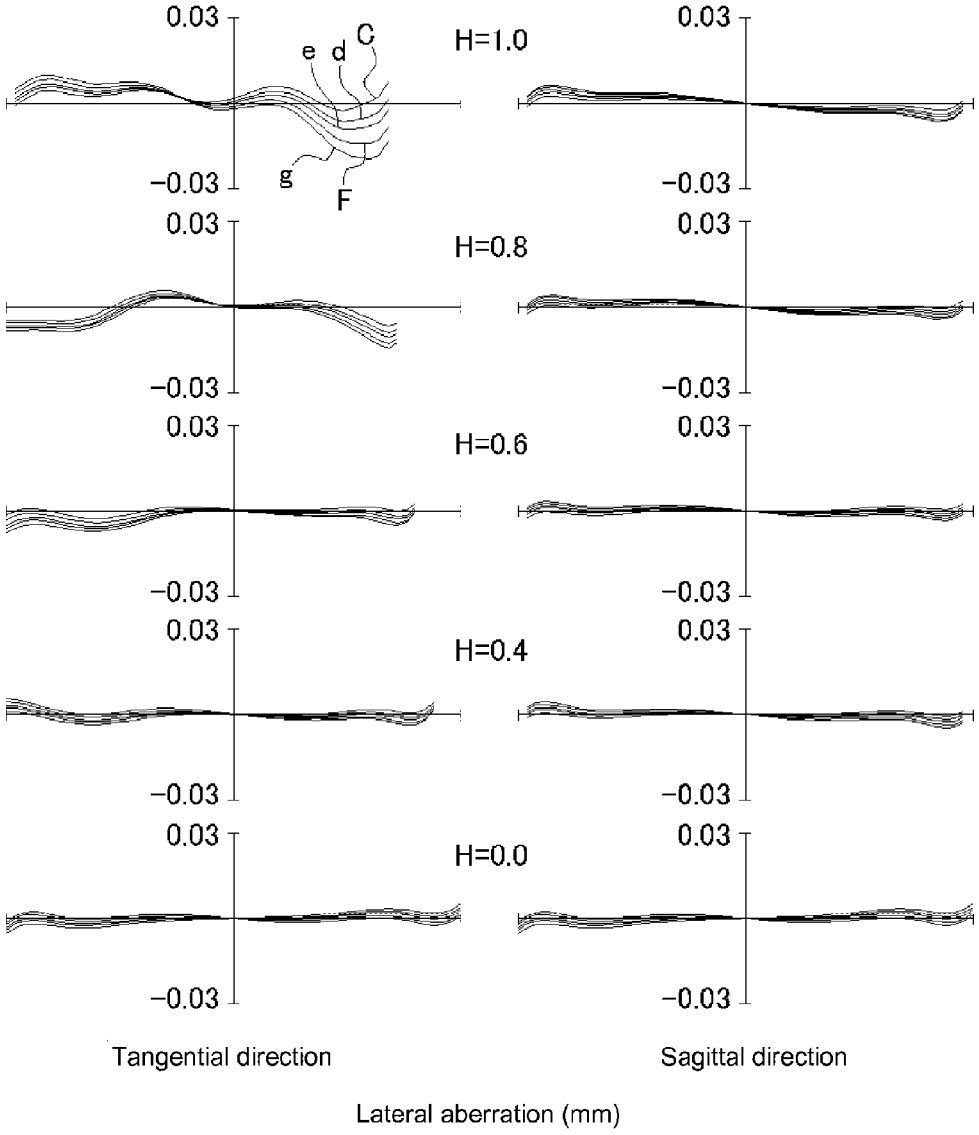
FIG. 11 is an aberration diagram showing a lateral aberration of the imaging lens of FIG. 10.
Figure 12:
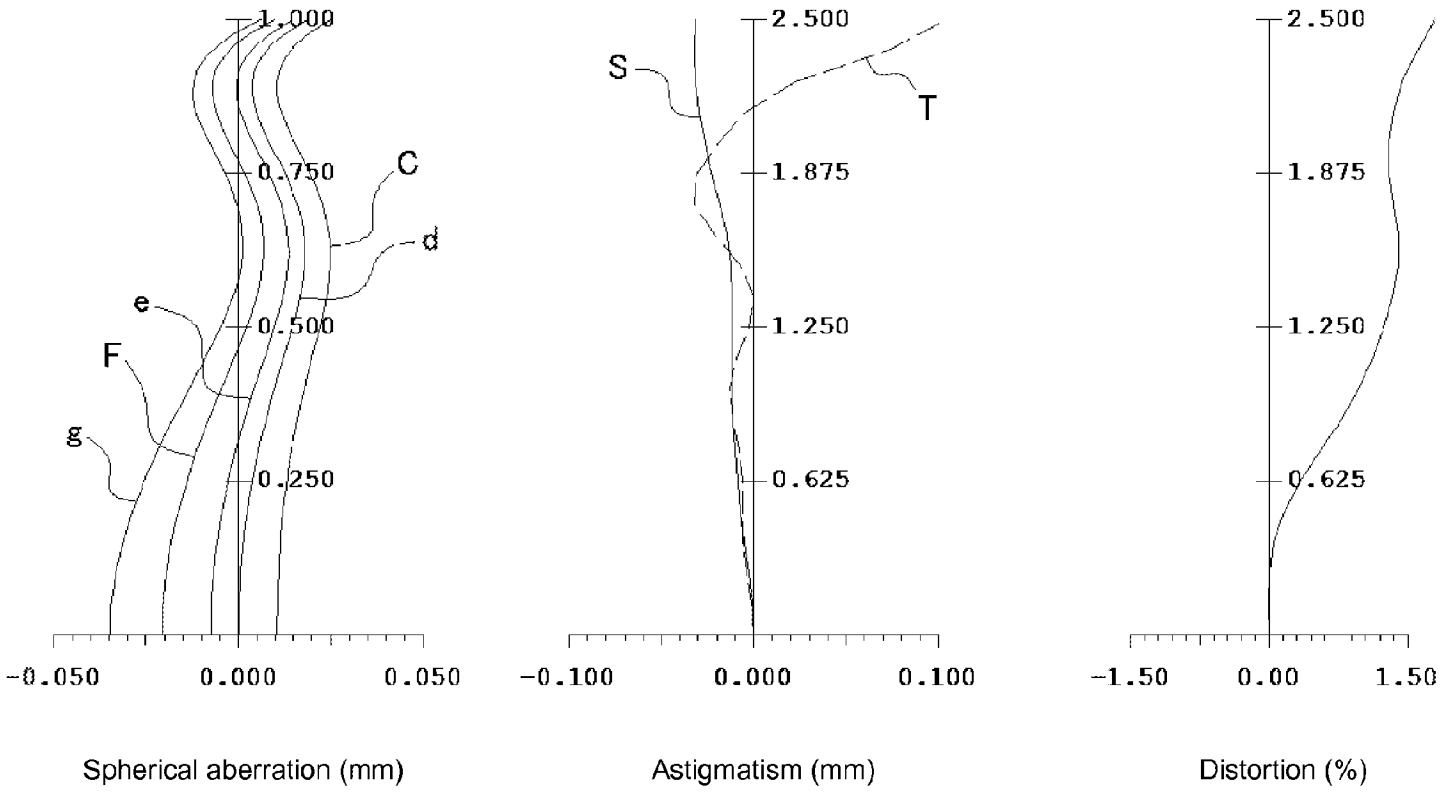
FIG. 12 is an aberration diagram showing a spherical aberration, an astigmatism, and a distortion of the imaging lens of FIG. 10.
Figure 13:
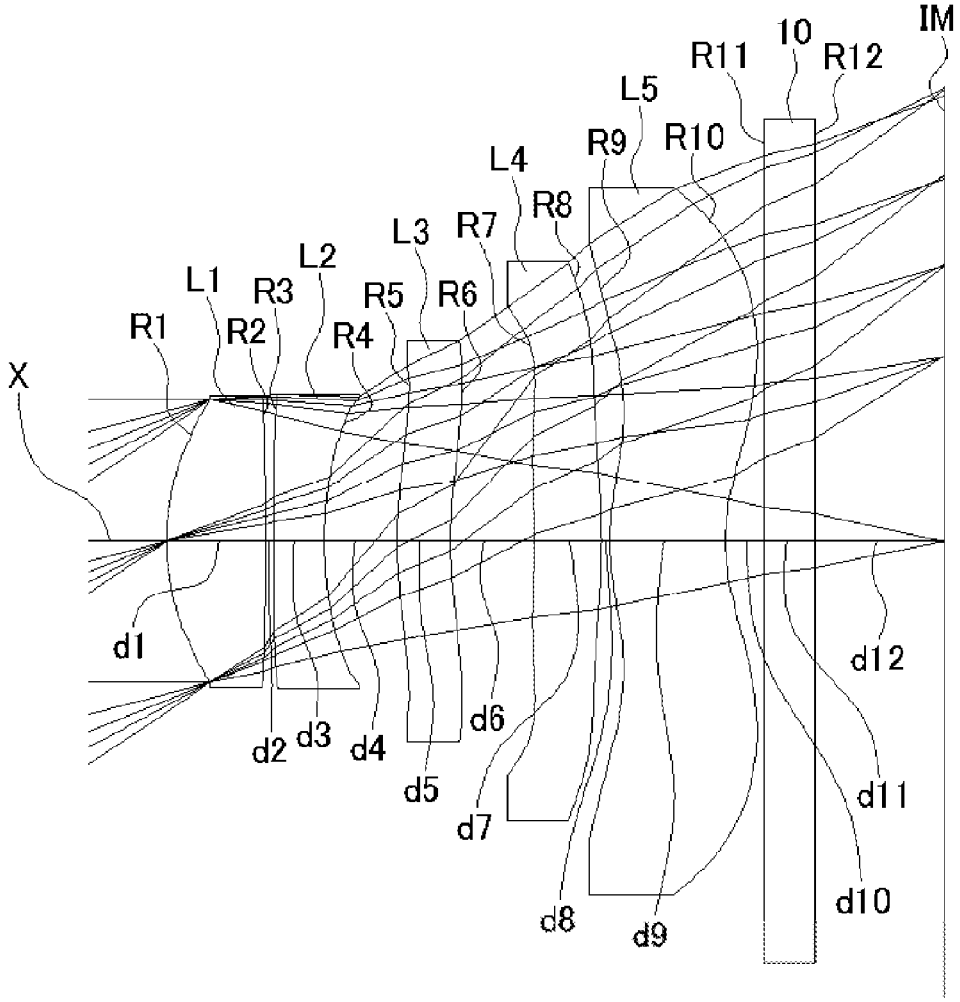
FIG. 13 is a sectional view showing a schematic configuration of an imaging lens of Numerical Data Example 5 according to the embodiment of the invention.

FIG. 11 shows the lateral aberration that corresponds to the image height ratio H, and FIG. 12 shows a spherical aberration (mm), an astigmatism (mm), and a distortion (%), respectively, in the imaging lens of Numerical Data Example 4. As shown in FIGS. 11 and 12, also in the imaging lens of Numerical Data Example 4, the image surface is satisfactorily corrected and the aberrations are suitably corrected similarly to Numerical Data Example 1.

NUMERICAL DATA EXAMPLE 5

Basic lens data are shown below.
f = 4.03 mm, Fno = 2.4, ω = 33.8°
Unit: mm

Surface Data

| Surface Number i | R | d | Nd | vd |
|---|---|---|---|---|
| (Object) | ∞ | ∞ | | |
| 1* (Stop) | 1.435 | 0.582 | 1.5346 | 56.0(=νd1) |
| 2* | 19.399 | 0.050 | | |
| 3* | 12.591(=R2f) | 0.300 | 1.6142 | 25.6(=νd2) |
| 4* | 2.327(=R2r) | 0.427(=dA) | | |
| 5* | 2.533 | 0.317 | 1.5346 | 56.0(=νd3) |
| 6* | 2.867 | 0.496(=dB) | | |
| 7* | −4.253 | 0.395 | 1.5346 | 56.0(=νd4) |
| 8* | −4.460 | 0.050 | | |
| 9* | 1.465 | 0.683 | 1.5346 | 56.0(=νd5) |
| 10* | 1.176 | 0.230 | | |
| 11 | ∞ | 0.300 | 1.5163 | 64.1 |
| 12 | ∞ | 0.758 | | |
| (Image plane) | ∞ | | | |

-continued

Basic lens data are shown below.
f = 4.03 mm, Fno = 2.4, ω = 33.8°
Unit: mm

Aspheric Surface Data

First Surface k = 0.000, $A_4$ = −1.069E−02, $A_6$ = −3.135E−02, $A_8$ = 6.640E−02, $A_{10}$ = −7.875E−02

Second Surface k = 0.000, $A_4$ = −2.936E−01, $A_6$ = 7.790E−01, $A_8$ = −8.988E−01, $A_{10}$ = 3.456E−01

Third Surface k = 0.000, $A_4$ = −3.251E−01, $A_6$ = 1.044, $A_8$ = −1.254, $A_{10}$ = 5.701E−01

Fourth Surface k = 0.000, $A_4$ = −1.182E−01, $A_6$ = 5.603E−01, $A_8$ = −6.761E−01, $A_{10}$ = 3.725E−01

Fifth Surface k = 0.000, $A_4$ = −2.166E−01, $A_6$ = 1.845E−01, $A_8$ = −2.115E−01, $A_{10}$ = 2.047E−01, $A_{12}$ = −5.521E−02, $A_{14}$ = −9.370E−02, $A_{16}$ = 5.066E−02

Sixth Surface k = 0.000, $A_4$ = −1.396E−01, $A_6$ = 9.119E−02, $A_8$ = −2.877E−01, $A_{10}$ = 5.054E−01, $A_{12}$ = −4.175E−01, $A_{14}$ = 1.590E−01, $A_{16}$ = −2.205E−02

Seventh Surface k = 0.000, $A_4$ = 3.837E−01, $A_6$ = −4.522E−01, $A_8$ = 2.893E−01, $A_{10}$ = −1.088E−01, $A_{12}$ = −2.938E−03, $A_{14}$ = 1.541E−02, $A_{16}$ = −3.082E−03

Eighth Surface k = 0.000, $A_4$ = 6.462E−02, $A_6$ = 4.386E−02, $A_8$ = −7.139E−02, $A_{10}$ = 3.095E−02, $A_{12}$ = −7.683E−03, $A_{14}$ = 1.586E−03, $A_{16}$ = −1.918E−04

Ninth Surface k = −1.584, $A_4$ = −4.420E−01, $A_6$ = 2.332E−01, $A_8$ = −5.365E−02, $A_{10}$ = 1.387E−03, $A_{12}$ = 1.454E−03, $A_{14}$ = −1.265E−04, $A_{16}$ = −1.213E−05

Tenth Surface k = −3.311, $A_4$ = −2.134E−01, $A_6$ = 1.163E−01, $A_8$ = −4.577E−02, $A_{10}$ = 1.136E−02, $A_{12}$ = −1.717E−03, $A_{14}$ = 1.438E−04, $A_{16}$ = −5.312E−06

| |
|---|
| f1 = 2.87 mm<br>f2 = −4.70 mm<br>f3 = 30.60 mm<br>f4 = −515.28 mm<br>f5 = −411.21 mm<br>f34 = 33.51 mm<br>$Z_{0.7}$ = 0.066 mm |

The values of the respective conditional expressions are as follows:

f2/f=−1.17 f1/f2=−0.61

R2f/R2r=5.41 f3/f=7.59

$Z_{0.7}$/f=0.016 f34/f=8.32 dA/dB=0.86

Accordingly, the imaging lens of Numerical Data Example 5 satisfies the above-described conditional expressions. A distance on the optical axis from an object-side surface of the first lens L1 to the image plane IM is 4.49 mm, and miniaturization of the imaging lens is suitably attained.

Figure 14:
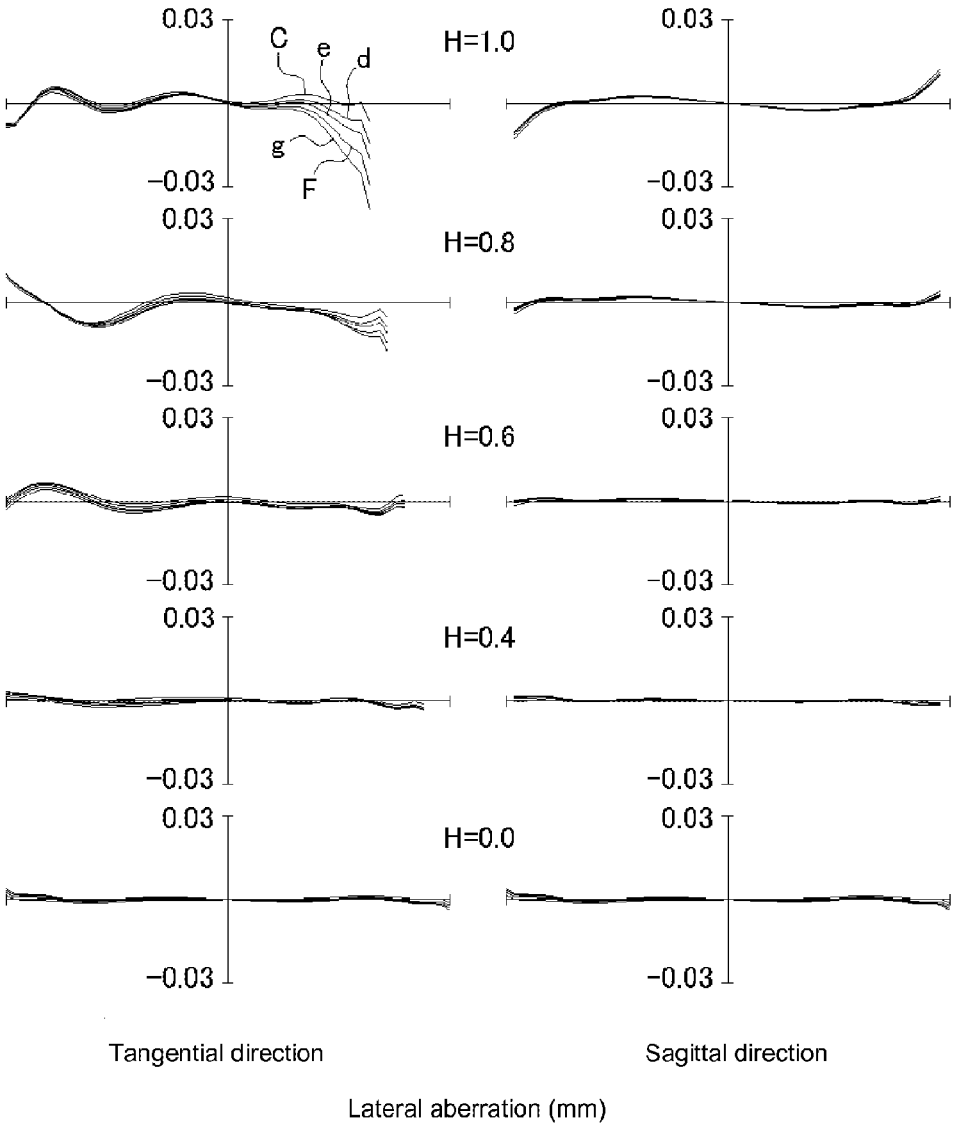
FIG. 14 is an aberration diagram showing a lateral aberration of the imaging lens of FIG. 13.
Figure 15:
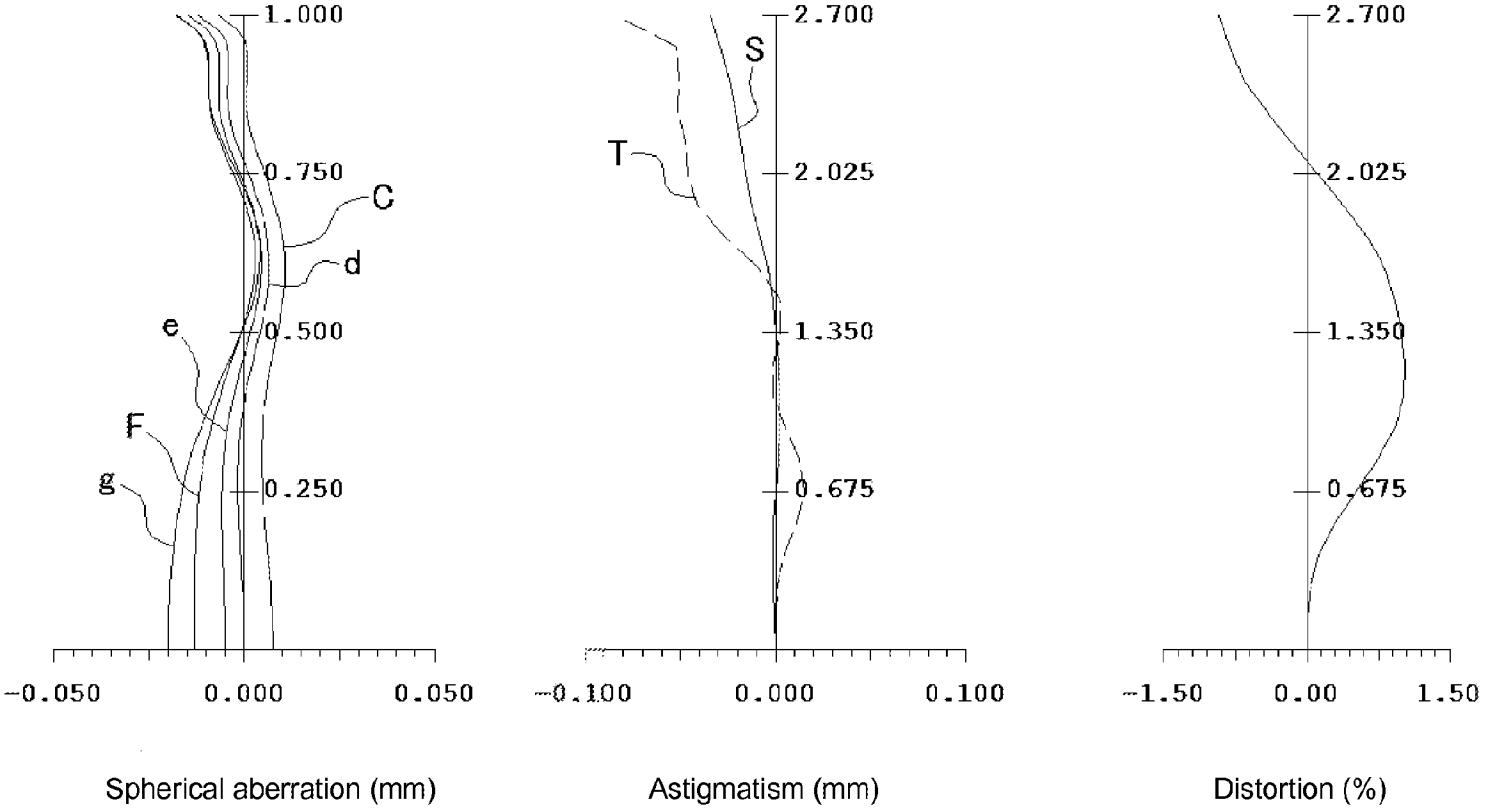
FIG. 15 is an aberration diagram showing a spherical aberration, an astigmatism, and a distortion of the imaging lens of FIG. 13.

FIG. 14 shows the lateral aberration that corresponds to the image height ratio H, and FIG. 15 shows a spherical aberration (mm), an astigmatism (mm), and a distortion (%), respectively, in the imaging lens of Numerical Data Example 5. As shown in FIGS. 14 and 15, also in the imaging lens of Numerical Data Example 5, the image surface is satisfactorily corrected and the aberrations are suitably corrected similarly to Numerical Data Example 1.

Accordingly, when the imaging lens of the embodiment is applied to an imaging optical system of a cellular phone, a digital still camera, a portable information terminal, a security camera, a vehicle onboard camera, a network camera, and the like, it is possible to achieve both the high performance and the small size for the camera or the like.

Here, the imaging lens of the invention is not limited to the above-described embodiment. In the above-described embodiment, any surfaces of the first lens L1 through the fifth lens L5 are formed as aspheric surfaces, but it is not necessary to form all the surfaces as aspheric surfaces. Alternatively, it is also possible to form one of or both surfaces of any lens from the first lens L1 through the fifth lens in a spherical surface(s).

The invention may be applicable to the imaging lens of a device that is required to have a small size and satisfactory aberration correction ability, e.g., the imaging lenses used in the cellular phones, the digital still cameras, and the like.

The disclosure of Japanese Patent Application No. 2011-190560, filed on Sep. 1, 2011, is incorporated in the application.

While the invention has been explained with reference to the specific embodiments of the invention, the explanation is illustrative and the invention is limited only by the appended claims.

What is claimed is:

1. An imaging lens comprising:

a first lens having positive refractive power;

a second lens having negative refractive power;

a third lens having positive refractive power;

a fourth lens having negative refractive power; and a fifth lens having negative refractive power, arranged in this order from an object side to an image plane side, wherein said first lens is formed in a shape so that a curvature radius of a surface thereof on the object side is positive, said second lens is formed in a shape so that a curvature radius of a surface thereof on the object side and a curvature radius of a surface thereof on the image plane side are both positive, said third lens is formed in a shape so that a curvature radius of a surface thereof on the object side is positive, said fifth lens is formed in a shape so that a curvature radius of a surface thereof on the object side and a curvature radius of a surface thereof on the image plane side are both positive, each of said first lens, said third lens, said fourth lens, and said fifth lens has an Abbe's number greater than 45, said second lens has an Abbe's number less than 35, and said third lens and said fourth lens have a composite focal length f34 and a whole lens system has a focal length f so that the following conditional expression is satisfied:

$$5.0<f34/f<25.0.$$

2. The imaging lens according to claim 1, wherein said first lens has a focal length f1, said second lens has a focal length f2, said third lens has a focal length f3, said fourth lens has a focal length f4, and said fifth lens has a focal length f5 so that the following conditional expressions are satisfied:

$$f1<f3 \text{ and } |f2|<f3$$

$$f3<|f4| \text{ and } |f2|<|f5|.$$

3. The imaging lens according to claim 1, wherein said fourth lens is formed in a shape so that a curvature radius of a surface thereof on the object side and a curvature radius of a surface thereof on the image plane side are both negative.

4. The imaging lens according to claim 1, wherein said second lens has a focal length f2 and a whole lens system has a focal length f so that the following conditional expression is satisfied:

$$-1.8<f2/f<-0.8.$$

5. The imaging lens according to claim 1, wherein said first lens has a focal length f1, and said second lens has a focal length f2 so that the following conditional expression is satisfied:

$$-1.0<f1/f2<-0.4.$$

6. The imaging lens according to claim 1, wherein said second lens is formed in the shape so that the surface thereof on the object side has the curvature radius R2f and the surface thereof on the image plane side has the curvature radius R2r so that the following conditional expression is satisfied:

$$1.5<R2f/R2r<6.0.$$

7. The imaging lens according to claim 1, wherein said third lens has a focal length f3, and a whole lens system has a focal length f so that the following conditional expression is satisfied:

$$5.0<f3/f<20.0.$$

8. The imaging lens according to claim 1, wherein said third lens is formed in the shape so that the surface thereof on the object side has a maximum effective diameter $\Phi_{3A}$ and a surface thereof on the image plane side has a maximum effective diameter $\Phi_{3B}$, said fourth lens is formed in the shape so that a surface thereof on the object side has a maximum effective diameter $\Phi_{4A}$ and a surface thereof on the image plane side has a maximum effective diameter $\Phi_{4B}$, a sag at up to 70% of the maximum effective diameters $\Phi_{3A}$ to $\Phi_{4B}$ has a maximum absolute value $Z_{0.7}$, and a whole lens system has a focal length f so that the following conditional expression is satisfied:

$$Z_{0.7}/f<0.1.$$

9. The imaging lens according to claim 1, wherein said second lens and said third lens are arranged so that the surface of the second lens on the image plane side is situated away from the surface of the third lens on the object side by a distance dA on an optical axis, and said third lens and said fourth lens are arranged so that the surface of the third lens on the image plane side is situated away from the surface of the fourth lens on the object side by a distance dB on the optical axis so that the following conditional expression is satisfied:

$$0.3<dA/dB<1.5.$$

10. An imaging lens comprising:

a first lens having positive refractive power;

a second lens having negative refractive power;

a third lens having positive refractive power;

a fourth lens having negative refractive power; and a fifth lens having negative refractive power, arranged in this order from an object side to an image plane side, wherein said first lens is formed in a shape so that a curvature radius of a surface thereof on the object side is positive, said second lens is formed in a shape so that a curvature radius of a surface thereof on the object side and a curvature radius of a surface thereof on the image plane side are both positive, said third lens is formed in a shape so that a curvature radius of a surface thereof on the object side is positive, said fifth lens is formed in a shape so that a curvature radius of a surface thereof on the object side and a curvature radius of a surface thereof on the image plane side are both positive, each of said first lens, said third lens, said fourth lens, and said fifth lens has an Abbe's number greater than 45, said second lens has an Abbe's number less than 35, said first lens has a focal length f1, said second lens has a focal length f2, said third lens has a focal length f3, said fourth lens has a focal length f4, and said fifth lens has a focal length f5 so that the following conditional expressions are satisfied:

$$f1<f3 \text{ and } |f2|<f3$$

$$f3<|f4| \text{ and } |f2|<|f5|, \text{ and}$$

a whole lens system has a focal length f so that the following conditional expression is satisfied:

$$5.0<f3/f<20.0.$$

11. The imaging lens according to claim 10, wherein said fourth lens is formed in a shape so that a curvature radius of a surface thereof on the object side and a curvature radius of a surface thereof on the image plane side are both negative.

12. The imaging lens according to claim 10, wherein said second lens has a focal length f2 and a whole lens system has a focal length f so that the following conditional expression is satisfied:

$$-1.8<f2/f<-0.8.$$

13. The imaging lens according to claim 10, wherein said first lens has a focal length f1, and said second lens has a focal length f2 so that the following conditional expression is satisfied:

$$-1.0<f1/f2<-0.4.$$

14. The imaging lens according to claim 10, wherein said second lens is formed in the shape so that the surface thereof on the object side has the curvature radius R2f and the surface thereof on the image plane side has the curvature radius R2r so that the following conditional expression is satisfied:

$$1.5<R2f/R2r<6.0.$$

15. The imaging lens according to claim 10, wherein said third lens is formed in the shape so that the surface thereof on the object side has a maximum effective diameter $\Phi_{3A}$ and a surface thereof on the image plane side has a maximum effective diameter $\Phi_{3B}$, said fourth lens is formed in the shape so that a surface thereof on the object side has a maximum effective diameter $\Phi_{4A}$ and a surface thereof on the image plane side has a maximum effective diameter $\Phi_{4B}$, a sag at up to 70% of the maximum effective diameters $\Phi_{3A}$ to $\Phi_{4B}$ has a maximum absolute value $Z_{0.7}$, and a whole lens system has a focal length f so that the following conditional expression is satisfied:

$$Z_{0.7}/f<0.1.$$

16. The imaging lens according to claim 10, wherein said third lens and said fourth lens have a composite focal length f34 and a whole lens system has a focal length f so that the following conditional expression is satisfied:

$$5.0<f34/f<25.0.$$

17. The imaging lens according to claim 10, wherein said second lens and said third lens are arranged so that the surface of the second lens on the image plane side is situated away from the surface of the third lens on the object side by a distance dA on an optical axis, and said third lens and said fourth lens are arranged so that the surface of the third lens on the image plane side is situated away from the surface of the fourth lens on the object side by a distance dB on the optical axis so that the following conditional expression is satisfied:

$$0.3<dA/dB<1.5.$$

*18. An imaging lens comprising:*

*a first lens having positive refractive power;*

*a second lens having negative refractive power;*

*a third lens;*

*a fourth lens; and*

*a fifth lens having negative refractive power, arranged in this order from an object side to an image plane side,*

*wherein said first lens is formed in a shape so that a curvature radius of a surface thereof on the object side is positive,*

*said second lens is formed in a shape so that a curvature radius of a surface thereof on the image plane side is positive,*

*said third lens is formed in a shape so that a curvature radius of a surface thereof on the object side is positive,*

*said fifth lens is formed in a shape so that a curvature radius of a surface thereof on the image plane side is positive, and*

*said third lens and said fourth lens have a composite focal length f34 and a whole lens system has a focal length f so that the following conditional expression is satisfied:*

$$5.0<f34/f<25.0.$$

*19. The imaging lens according to claim 18, wherein said second lens is formed in a shape so that a curvature radius of a surface thereof on the object side is positive,*

*said fifth lens is formed in a shape so that a curvature radius of a surface thereof on the object side is positive,*

*each of said first lens, said third lens, said fourth lens, and said fifth lens has an Abbe's number greater than 45, and*

*said second lens has an Abbe's number less than 35.*

*20. The imaging lens according to claim 18, wherein said first lens has a focal length f1,*

*said second lens has a focal length f2,*

*said third lens has a focal length f3,*

*said fourth lens has a focal length f4, and*

*said fifth lens has a focal length f5 so that the following conditional expressions are satisfied:*

$$f1<f3 \text{ and } |f2|<f3$$

$$f3<|f4| \text{ and } |f2|<|f5|.$$

* * * * *